US007785089B2

(12) United States Patent
Teckoe et al.

(10) Patent No.: US 7,785,089 B2
(45) Date of Patent: Aug. 31, 2010

(54) ADDITIONAL IMPROVEMENTS IN POWDER COMPACTION AND ENROBING

(75) Inventors: Jason Teckoe, Ely (GB); Colin Merwood, Havant (GB); Michael Dann, Pinner (GB); Stephen Ronald Kessel, Warboys (GB); Ian Povey, Stamford (GB); Martin Good, Ruislip (GB)

(73) Assignee: Bioprogress Technology Limited (GB)

( * ) Notice: Subject to any disclaimer, the term of this patent is extended or adjusted under 35 U.S.C. 154(b) by 410 days.

(21) Appl. No.: 11/089,188

(22) Filed: Mar. 24, 2005

(65) Prior Publication Data

US 2005/0266116 A1 Dec. 1, 2005

(30) Foreign Application Priority Data

Sep. 24, 2003 (GB) ................................ 0322358.3
Sep. 24, 2004 (GB) ............... PCT/GB2004/004097

(51) Int. Cl.
*B29C 43/08* (2006.01)

(52) U.S. Cl. ......................... 425/78; 425/121; 425/289; 425/345; 425/353; 425/504

(58) Field of Classification Search ................. 425/112, 425/289, 127, 121, 388, 210, 123, 225, 78, 425/345, 353–355, 387.1, 324.1, 503–504, 425/515; 264/255
See application file for complete search history.

(56) References Cited

U.S. PATENT DOCUMENTS

| | | | | |
|---|---|---|---|---|
| 3,096,248 | A | 7/1963 | Rudzki | |
| 3,677,673 | A | 7/1972 | Leonard | |
| 4,072,551 | A * | 2/1978 | Dabal et al. | 425/294 |
| 4,401,614 | A * | 8/1983 | DeSantis | 425/355 |
| 5,074,102 | A * | 12/1991 | Simpson et al. | 53/454 |
| 5,603,880 | A * | 2/1997 | Kato et al. | 264/112 |
| 5,682,733 | A | 11/1997 | Perrone | |
| 2003/0070903 | A1 | 4/2003 | Sowden | |

FOREIGN PATENT DOCUMENTS

| | | |
|---|---|---|
| EP | 0 691 121 A2 | 10/1996 |
| EP | 1 149 689 | 10/2001 |
| WO | WO 03/020246 | 3/2003 |

OTHER PUBLICATIONS

PCT International Search Report for related PCT Application No. PCT/GB2004/004097, 8 pages.
PCT Written Opinion of the International Searching Authority for related PCT Application No. PCT/GB2004/004097, 10 pages.

* cited by examiner

*Primary Examiner*—Richard Crispino
*Assistant Examiner*—Thu Khanh T Nguyen
(74) *Attorney, Agent, or Firm*—McDermott Will & Emery LLP

(57) ABSTRACT

An apparatus and method is disclosed for forming a compacted powder slug coated with a film. The powder, e.g. of a medicament, is compacted and enrobed to produce compacted powder slugs by preferably mechanically compacting a powder and forming a film of a material, preferably hydroxy propyl methyl cellulose, by vacuum or pressure differential, about the surface of the powder thus compacted.

7 Claims, 36 Drawing Sheets

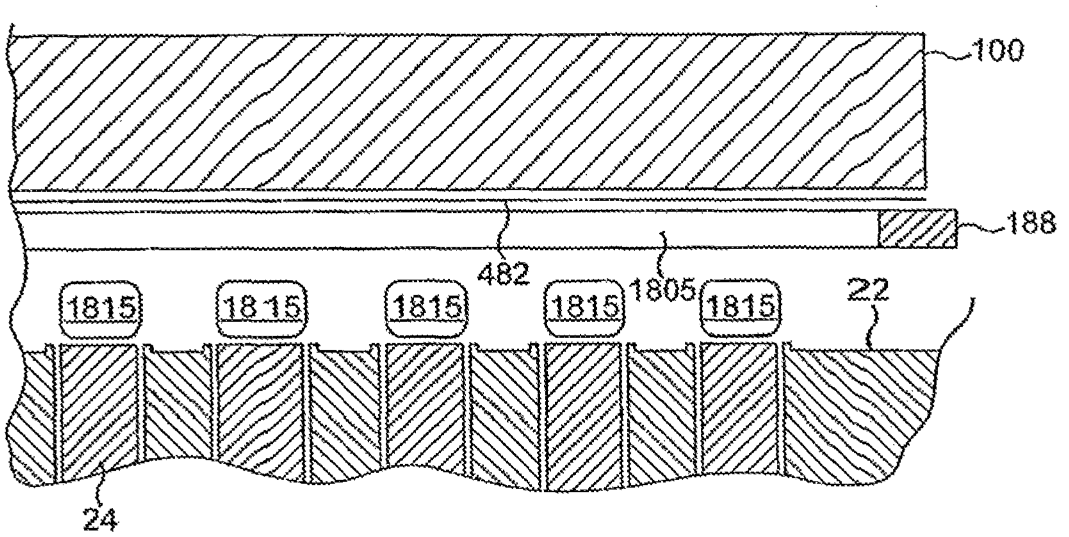
FIG. 16B(i)
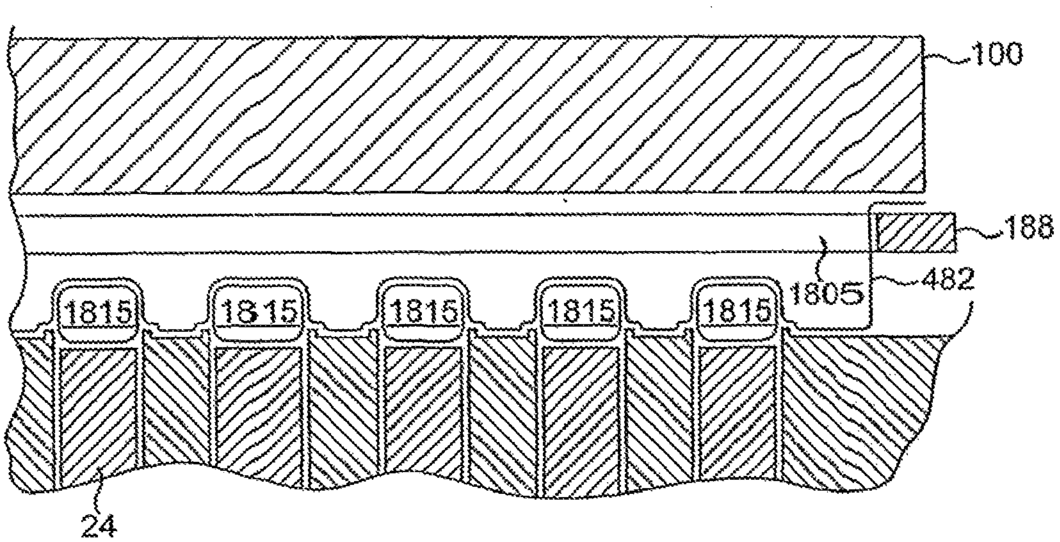
FIG. 16B(ii)

FIG. 23

| Process | | | | Time (seconds) | | | | | | | | | | | | | | | | | | | |
|---|---|---|---|---|---|---|---|---|---|---|---|---|---|---|---|---|---|---|---|---|---|---|---|
| Description | ID | Sub-process | Position | 0.5 | 1.0 | 1.5 | 2.0 | 2.5 | 3.0 | 3.5 | 4.0 | 4.5 | 5.0 | 5.5 | 6.0 | 6.5 | 7.0 | 7.5 | 8.0 | 8.5 | 9.0 | 9.5 | #### |
| Index table | A1 | Rotate table through 90° | Index | ■ | ■ | | | | | | | | | | | | | | | | | | |
| Index Film 1 | B1 | Index film across position 1 | Pos 1 | ■ | ■ | | | | | | | | | | | | | | | | | | |
| Index Film 2 | C1 | Index film across position 3 | Pos 3 | ■ | ■ | | | | | | | | | | | | | | | | | | |
| Thermoform Film 1 to form the bottom half of the tablet shell | D1 | Move thermoforming chamber 1 into operating position | Pos 1 | ■ | ■ | | | | | | | | | | | | | | | | | | |
| | D2 | Close thermoforming chamber 1 | Pos 1 | | | ■ | | | | | | | | | | | | | | | | | |
| | D3 | Top vacuum on and heat film | Pos 1 | | | | ■ | ■ | ■ | ■ | | | | | | | | | | | | | |
| | D4 | Lower vacuum on | Pos 1 | | | | | ■ | ■ | ■ | ■ | ■ | | | | | | | | | | | |
| | D5 | Vent top vacuum on and hold lower vacuum | Pos 1 | | | | | | | | ■ | ■ | | | | | | | | | | | |
| | D6 | Open thermoforming chamber 1 | Pos 1 | | | | | | | | | | ■ | | | | | | | | | | |
| | D7 | Move thermoforming chamber 1 into parked position | Pos 1 | | | | | | | | | | | ■ | | | | | | | | | |

ADDITIONAL IMPROVEMENTS IN POWDER COMPACTION AND ENROBING

FIELD OF THE INVENTION

This invention concerns the compacting of powder e.g. a powder containing a medicament, vitamin, dietary supplement etc, and such compacted powder being enrobed by a biodegradable and/or water soluble film, for example a non-gelatin film, such as hydroxypropyl methyl cellulose (HPMC), to produce encapsulated bodies of compacted powder, suitable for dosage forms, e.g. for human ingestion. The invention is applicable to all related dosage forms, including tablets and capsules, but for simplicity all such forms will be as tablets.

BACKGROUND TO THE INVENTION

Tablets are a common type of dosage form and various means for improving their properties have been tried. Current methods for coating tablets, such as pharmaceutical tablets include the using of acelacoaters or pan coaters, which spray low molecular weight HPMC grades onto tablets so imparting a surface layer, which is uniform and smooth, but opaque and low gloss. It is possible for the tablets to have embossed lettering on them. This method of coating tablets is however time consuming and requires a high level of expertise to produce satisfactory results. Production complications such as tablet twinning are common, where two tablets become attached to one another during the spray coating operation. In addition to these problems it is necessary to compact the tablets under relatively high pressures so that they do not disintegrate during the coating process. This high level of compaction can have an adverse effect on the disintegration and dissolution rates of active ingredients contained within the capsule, for example, leading to a delay in the release of a drug to a patient, whilst the tablet slowly dissolves in the stomach of the patient.

An alternative to spray or pan coating is to use two-piece hard capsules. These are produced by a dipping process, typically a HPMC solution is used, producing half shells which interlock and thus produce an enclosed capsule. These capsules are typically opaque but glossy, and cannot have any form of embossment, as this would interfere with the overlap interlocking process. The nature of the capsule dictates that there will always be an airspace above the powder fill level. Additionally, it is not possible to compact the powder into these tablets, and this so limits the quantity of powder which can be encapsulated. It follows that this lack of compaction can effectively reduce the amount of e.g. medicament which can be encapsulated. The existence of the air space in the capsule and lack of compaction of the powder contained within the capsule leads to a capsule that is inevitably larger than necessary.

It has also been found that, after manufacture and/or sale of two-piece hard capsules, the capsules can be easily and illegally interfered with, as it is possible to separate the two halves of the capsule and tamper with its contents and replace the two halves back together without there being any obvious change in the capsule's external appearance such to suggest to the user that there was anything wrong with the capsule. This means that it can be difficult to detect capsules which have had their contents tampered with. HPMC and certain other non-gelatin materials are suitable for ingestion by humans, so delivery capsules with gelatin walls find potential use as ingestible capsules, e.g. for the delivery of accurately metered doses of pharmaceutical preparations and dietary supplements, as a possible replacement for gelatin based capsules. Conventional tablets have already been enrobed. See for example WO 02/098394.

SUMMARY OF THE INVENTION

According to an aspect of the invention there is provided apparatus for forming a film onto dosage forms, comprising:

- a platen for holding oral dosage forms onto which a film is to be formed, directly;
- at least one film supply arrangement;
- at least one film conditioning unit (also referred to a "pre-conditioning unit");
- a barrier plate disposed between said film conditioning means and said target tablets such that, in use, the barrier protects the oral dosage forms from the effects of film conditioning.

According to another aspect of the invention there is provided a method of forming a film directly onto a dosage form, comprising:

- providing a platen for holding oral dosage forms, directly onto which a film is to be formed;
- providing a film from a film supply arrangement onto a barrier plate, the barrier plate being disposed between a film conditioning unit and the oral dosage forms onto which the film is to be formed;
- conditioning the film; and
- forming the film directly onto said oral dosage forms.

According to another aspect of the present invention there is provided apparatus for forming dosage forms coated with film, comprising:

- a platen comprising a substantially flat platen surface providing a plurality of locations for accommodating dosage forms;
- a film conditioning unit deployable to condition a film to impart to the film properties enabling the film to be formed onto dosage forms in said locations; and
- a barrier disposed between the said platen surface and said film conditioning unit, said barrier comprising an opening through which the film is formable when it has been conditioned.

According to another aspect of the present invention there is provided a method for forming dosage forms coated with film, comprising:

- providing a plurality of dosage forms in a plurality of locations for accommodating dosage forms;
- providing a film to be formed onto said dosage forms;
- providing a barrier disposed between said film and said dosage forms, said barrier being provided with an opening through which the film may be formed directly onto said dosage forms;
- conditioning said film to impart properties enabling it to be formed;
- and forming the films through said barrier onto the dosage forms.

According to another aspect of the present invention there is provided apparatus for forming a dosage forms coated with film, the apparatus comprising:

- one or more platens for holding dosage forms, said platen being movable between a plurality of stations each performing steps in an enrobe process;
- a station at which a conditioned film is formed onto a target associated with said platen; and
- one or more film lifters operable to separate waste film from said platen after the forming step.

According to another aspect of the present invention there is provided a method for forming dosage forms coated with film, the apparatus comprising:

providing a platen for holding dosage forms;

conditioning said film and forming it onto a target associated with said platen using vacuum and/or pressure to form enrobe products;

cutting the enrobe products from the film to leave a waste film;

separating the waste film from said platen after the forming step using one or more film lifters operable to urge the waste film in a direction away from the platen; and moving the platen to another station of the plurality of stations.

According to another aspect of the present invention there is provided apparatus for forming a compacted powder slug coated with a film, comprising:

compaction equipment capable of a first enrobing step in which powder is compacted into a film formed in a plurality of pockets to provide a plurality of partially enrobed powder slugs;

enrobe equipment capable of a second enrobing step in which the partially enrobed powder slugs are enrobed to produce completely enrobed powder slugs;

a transfer and cutting tool comprising a cutter and a transfer gasket.

According to another aspect of the present invention there is provided a method for forming a compacted powder slug coated with a film, comprising:

performing a first enrobing step in which powder is compacted into a film formed in a plurality of pockets to provide a plurality of partially enrobed powder slugs;

performing a second enrobing step in which the partially enrobed powder slugs are enrobed to produce completely enrobed powder slugs in a film web;

cutting the enrobed powder slugs from the film web using a combined cutter and transfer tool, the cutter being brought into cutting engagement with the film web to cut the completely enrobed powder slugs from the film web before further moving the cutter over the slugs so as to bring the slugs into press-fit engagement with a transfer component of the tool; and transferring the completely enrobed powder slugs.

According to another aspect of the present invention there is provided a combined cutting and transfer tool for cutting tablets from a waste film web and holding the tablets for transfer, comprising:

a cutter provided with a plurality of cutter holes extending between a cutting surface and non-cutting surface thereof;

a transfer gasket provided proximate the non-cutting edge of the cutter, the transfer gasket comprising a plurality of press-fit holes in locations linking to the holes in the cutter.

According to another aspect of the present invention there is provided a method for cutting and transferring tablets from a waste film using a combined cutting and transfer tool having a transfer gasket which follows a cutter in the direction of the cut, the method comprising:

deploying the combined cutter and transfer too such that cutter holes of the cutter tool provide cutting engagement with the waste film web to cut the tablets from the web;

continuing the motion of the combined cutter and transfer tool in the direction of the cut until the tablets achieve press-fit engagement with press-fit holes in the transfer gasket; and transferring the tablets.

According to another aspect of the present invention there is provided a method of ironing a plurality of enrobed dosage forms, the method comprising:

deploying a transfer arm to retain a plurality of enrobed dosage forms in a press-fit gasket of the transfer arm;

deploying said transfer arm to a position adjacent an ironing tool having a plurality press-fit ironing orifices;

operating a finger pusher to so as to simultaneously urge said plurality of dosage forms from said press-fit locations in the gasket to said press-fit locations in said ironing tool;

allowing a predetermined time for heating of said plurality of dosage forms in said ironing tool; and operating said finger pushers to simultaneously urge said plurality of ironed dosage formed from the ironing tool to a collocation location.

According to another aspect of the present invention there is provided apparatus for forming compacted powder slugs coated with a film comprising:

compaction equipment capable of performing a first enrobing step in which powder is compacted into a film formed in a pocket to provide a partially enrobed powder slug;

enrobe equipment capable of performing a further enrobing step in which the remainder of said partially enrobed powder slug is enrobed; and a jet sprayer operable to apply fluid to said powder slugs.

According to another aspect of the present invention there is provided apparatus for forming a compacted powder slug coated with a film, comprising:

a powder store;

compaction equipment capable of compacting powder in a film formed into a pocket to produce a partially enrobed powder slug;

a powder doser operable to deliver powder between the powder store and the compaction equipment, said powder doser being operable to collect powder from the powder store and to pre-compact the powder before transferring it to the compaction equipment, wherein said pre-compaction by said powder doser is performed to a lower pressure than said compaction by said compaction equipment.

Another aspect of the invention provides an apparatus for forming a compacted powder slug coated with a film, comprising a platen having a pocket for receiving a vacuum formed film into the pocket and receiving a powder; and a mechanical means comprising a compression piston for compacting the powder in the pocket, the compression piston having a front face with a concave recess and a square edge around the circumference of the front face.

In an embodiment the pocket has a base formed by a lower piston, the lower piston having a front face with a concave recess and a square edge around the circumference of the front face. The front face of the lower piston further comprises at least two apertures to allow a vacuum to be formed in the pocket for vacuum forming the film. The platen further comprises an aperture to allow a vacuum to be formed between the platen and the film. An array of apertures are formed in the platen around the circumference of the pocket. The platen further comprises a recessed surface defining a raised edge forming the circumference of the pocket. The diametric clearance between the compression piston and the pocket is a fraction of the film thickness. The diametric clearance between the compression piston and the pocket is at most 35 micrometres. The diametric clearance between the lower piston and the pocket is a fraction of the film thickness.

The diametric clearance between the lower piston and the pocket is at most 25 micrometres. The platen further comprises an array of pockets. A means for conditioning the film for temporarily retaining and heating, the means for conditioning comprising a heated plate having a surface with an array of apertures for forming a vacuum between the heated plate and the film may be provided in the apparatus. The apparatus may further comprise a gasket for receiving and retaining the compacted powder slug to transport and release the compacted powder slug to a desired location. The gasket may comprise an aperture with a receiving side for receiving the compacted powder slug and an exit side, the receiving side having a greater diameter than the exit side.

Another aspect of the invention provides an apparatus for forming a compacted powder slug coated with a film, comprising a film preconditioner for temporarily retaining and heating the film, said film preconditioner comprising a heated plate having a surface with an array of apertures for forming a vacuum between the heated plate and the film, a platen having a pocket for receiving said preconditioned film into the pocket under vacuum, and receiving the powder; and a mechanical means for compacting the powder in said pocket.

Another aspect of the invention provides an apparatus for forming a compacted powder slug coated with a film comprising a platen comprising an array of pockets for receiving a vacuum formed film into the pockets, said pockets receiving the powder, the platen comprising at least one aperture proximate to said pockets to allow a vacuum to be formed between the platen and the film; and a mechanical means for compacting the powder in said pocket. In an embodiment of the invention an array of apertures are formed in the platen around the circumference of the pocket.

An aspect of the invention provides an apparatus for forming a compacted powder slug coated with a film comprising a platen comprising an array of pockets for receiving a vacuum formed film into the pockets receiving the powder, the platen having a recessed surface between a plurality of raised edge profiles each forming a circumference of a pocket; mechanical means for compacting the powder in said pocket; and a cutting sleeve moveable to interfere with said raised edge profile to cut a film supported thereon.

In an embodiment, the apparatus may further comprise a turntable for holding the platen and transferring the platen during processing. The turntable may comprise four platens. The apparatus may further comprise a vacuum for cleaning the platen.

Another aspect of the invention provides an apparatus of any one of the preceding claims further comprising a dosator and a dosing unit for dosing the pocket with powder, the dosator comprising a powder hopper for holding the powder, and a dosing head having dosing tubes for retaining powder from the powder hopper and transferring the powder to the pocket. The dosing head may have tamping pins within the tubes for pre-compacting the powder in the dosing tubes and transferring the powder from the tubes into the pocket. In an embodiment the apparatus may have a dosing unit having the mechanical means for compacting, and a dosing sledge for receiving the powder from the dosing tubes of the dosing head and dosing the pockets with the powder, the sledge moveable from a charging position to a dosing position.

Another aspect of the invention provides an apparatus for forming a compacted powder slug encapsulated with a film comprising a platen having a pocket for receiving a first vacuum formed film into the pocket and receiving a powder; a dosing means for placing the powder in a position suitable for compaction of the powder in the pocket having the first vacuum formed film with powder; a compacting mechanical means for compacting the powder; a turntable for holding the platen and rotatable to transfer the platen from one station to another station during processing, a station for applying the film into the pocket of the platen and compacting the powder to partially enrobe the compacted powder, another station for applying a second vacuum formed film onto the partially enrobed compacted powder to completely coat the slug with film.

In an embodiment the dosing means places the powder proximate the pocket in a position suitable for compaction of the powder in the pocket having the first vacuum formed film with powder. The dosing means may dose the pockets having the first vacuum formed film with the powder.

In an embodiment the apparatus may compare a vacuum for cleaning the platen, and another station for cleaning the platen. The number of platens in the turntable may correspond to the number of stations in the apparatus. The turntable may comprise four platens for processing in another embodiment. The apparatus during said compaction may process comprise a means for isolating the compaction pressure forces from the turntable assembly.

Another aspect of the invention provides an apparatus for forming a compacted powder slug coated with a film, comprising a platen having a pocket for receiving a vacuum formed film into the pocket and receiving a powder a mechanical means for compressing the powder in the pocket; and a gasket for receiving and retaining the compacted powder slug to transport and release the compacted powder slug to a desired location. The gasket may comprise an aperture having a receiving side for receiving the compacted powder slug and an exit side, the receiving side having a greater diameter the exit side. The gasket may comprise an array of apertures for receiving more than one compacted powder slug.

One aspect of the invention concerns a novel method for compacting and enrobing a powder to produce capsules with enhanced properties.

A non gelatin film layer is thermoformed tablet shaped pocket under the influence of heat and/or vacuum, and/or pressure. A pre-determined mass of powder is dosed into the film formed pocket, and compressed into a tablet shape e.g. with the aid of a piston or pistons. A partially enrobed 'soft' tablet results from this process, which is then fully enrobed by a second sequence of events which involves the raising of the tablet above a platen which allows the remainder of the compressed tablet to be enrobed by a second film. Suitable tablet shaped pockets can be created by using e.g. a pair of pistons slideable within a cylinder, such pistons also having the advantage of being able to form pinch points between the platen and the top of cylinders which are useful for cutting away unwanted excess film from the (partially) enrobed tablets.

One of the aims of the present invention is to produce tamper evident capsules.

Another aim of preferred embodiments is to produce powder filled capsules whereby the powder is enrobed with a material which may or may not form a 'skin tight wrap'.

Another aim of preferred embodiments is to produce a capsule with a high gloss surface which is able to adopt an underlying embossment, e.g. to identify a pharmaceutical tablet.

Another aim of preferred embodiments is to produce capsules which have a flange which is almost non-discernible.

Another aim of preferred embodiments is to enable the production of dosage forms in a wide variety of shapes and sizes, which, because of the nature of the processes involved and the properties of the product produced, includes shapes and sizes of dosage forms which have not been previously possible to make or practical to use.

Another aim of preferred embodiments is to produce capsules with favourable properties and which contain powder or other flowable solid material which is at a favourable state of compaction and/or composition, and/or the encapsulating medium of the capsule being fast dissolving or dissolvable (with control) pharmaceutical grade films plasticised with pharmaceutical grade materials.

Another aim of preferred embodiments is to produce capsules, which by their nature, are easy to swallow, and more easily can be conveyed to the site where it is desirable where the active ingredients are most advantageously released.

Another aspect the present invention is a method of powder compaction to produce powder compacted slugs, which, for example can be enrobed to produce capsules which possess enhanced disintegration and dissolution properties over and above traditional tablets.

Another aspect of the present invention is a method of producing a capsule, which, at the very least can perform the same function as a conventional coated tablet, but in which the conventional tablet pressing and coating stages are replaced by a single powder enrobing process.

Another aspect of the present invention is a method of producing a capsule by enrobing powder, in which, because of the nature of capsule produced, certain ancillary ingredients necessary in conventional tablet production, can be omitted. For example, ingredients in a tablet which are added to give structural integrity can be omitted, because the active ingredients are in powder form, relatively loosely compacted are encapsulated within a film, such film which now securely packages the powder/ingredients, thus giving integrity and forming a discrete effective dosage form. Because of the aforementioned, components contained within a tablet which are designed to disperse and break up the tablet when it has reached the site of delivery, can be omitted, as the active ingredients in the capsule according to the present invention are in a non-compacted or at least less compacted form as compared to a conventional tablet, and this lesser compaction leads to the easy release and dispersal of active ingredients once the capsule film has dissolved, e.g. at the intended site of delivery.

Another aspect of the invention provides a method of enrobing compacted powder, comprising vacuum forming a film into a pocket compacting a powder in said pocket, resulting in a partially enrobed powder slug in a pocket. Vacuum forming a second film over this powder slug to completely enrobe the powder slug, forms a discrete compacted powder filled capsule, suitable for use as a dosage form.

In yet another aspect of the present invention provides a method of enrobing compacted powder using film or films, to form a compacted powder filled capsule, wherein the film or films forming the wall of the compacted powder filled capsule used overlap each other.

In a further aspect of the present invention provides a method of forming and/or enrobing a compacted slug wherein the level of compaction of the compacted powder is less than that necessary to reach the industry standard for the discrete slug of compacted powder to be described as a tablet.

In practising the method of the invention, the films are caused to deform to conform with the external surface of the pocket and the compacted powder slug, the films effectively forming a secure capsule, by being wrapped around the powder slug. Vacuum chamber or vacuum bed apparatus, in which the films and powder are located in a suitably shaped support and exposed to conditions of vacuum (or substantially reduced pressure) can be modified and used for this purpose. Such apparatus may be based on commercially available vacuum chamber or vacuum bed apparatus, suitably modified. Vacuum forming techniques result in the compacted powder being completely enclosed and encapsulated within a film, leading to a capsule containing compacted powder, such capsule having enhanced and controllable properties over dosage forms currently available, such as conventional tablets.

The powders to be compacted are typically subjected to pressures between, but not limited to, 5-15 mega pascals. Examples of powders compacted and enrobed include paracetamol, ibuprofen, sorbital and multivitamin. Other powder fills which are contemplated are antacid, anti-inflammatory, anti-histamine antibiotic and anti-cholesterol drugs.

The film should be a material which is suitable for human consumption and that has sufficient flexibility and plasticity to be vacuum formable. Some film materials have suitable properties in their natural condition, but commonly it will be necessary to pre-treat the film material so that it is vacuum formable. For example, it may be necessary to expose the film material to a solvent therefor; for instance certain grades of polyvinyl alcohol (PVA) will vacuum form after application of a small amount of water to the surface thereof or when exposed to conditions of high humidity. A further generally preferred possibility, is to use a film of thermoplastic material (i.e. material capable of deforming on heating) with the film to be in heat-softened condition prior to being thermoformed by exposure to differential pressure. Embodiments are envisaged to employ application of vacuum and/or positive pressure to generate the differential pressure. Suitable thermoplastic materials include modified cellulose materials, particularly hydroxypropyl methyl cellulose (HPMC) and hydroxypropyl cellulose (HPC), polyvinyl alcohol (PVA), polyethylene oxide (PEO), pectin, alginate, starches, and modified starches, and also protein films such as soya and whey protein films. The currently preferred film material is HPMC. Suitable film materials are currently available.

When using thermoplastic film, the film is typically heated prior to application to pocket or compacted powder slug, so that the film is in a heat softened deformable condition. This can be achieved by exposing the film to a source of heat e.g. an infrared heater, infrared lamps, a heated plate a hot air source etc. In the process described, a range of temperatures may be used, but by way of example only, where films of different thickness may be utilized for the first and second films in the process, a first film forming temperature of around 150 degrees celsius may be used and for the second film forming stage, a range of approximately 70-80 degrees celsius may be used.

During the enrobing process, films may be caused to overlap, preferably a minimum of 1.5 mm-2 mm. Compacted powder slugs may preferably have a sidewall height of about 3 mm and films may be caused to overlap substantially completely over the sidewall area.

The film material may include optional colourings, e.g. in the form of food dyes such as FD and C yellow number 5, and/or optional flavourings, e.g. sweeteners, and/or optional textures etc in known manner.

The film material typically includes plasticiser to give desired properties of flexibility to the film in known manner. Materials used as plasticisers include alpha hydroxy acids such as lactic acid and salts thereof, maleic acid, benzyl alcohol, certain lactones, diacetin, triacetin, propylene glycol, glycerin or mixtures thereof. A typical thermoplastic film formulation is HPMC 72-77% by weight, plasticiser 28-23% by weight. Preferably the film formulation is HPMC 74% by weight, and plasticiser 26% by weight.

The film suitably has a thickness in the range 20-200 microns, conveniently 50 to 100 microns, e.g. at about 80 microns, with appropriate film thickness depending on factors including the size and form of the tablet. Films of different thickness may be used, e.g. a film of greater thickness may be used in the first stage of the enrobing process, say 125 microns thickness and a film of lesser thickness may be used in the second stage of the enrobing process, say 80 microns thickness.

Because of the nature of the film forming process according to the present invention, under certain circumstances, e.g. where the powder to be compacted contains particles which, under compaction, have the ability to pierce film, it may be advantageous to have the thickness of the film formed in the pocket to be greater than that of the film which is to cover the remainder of the compacted powder slug (in the second and final phase of enrobement of the compacted powder). Such differential thickness may give rise to certain advantageous structural features of the resultant capsule; the capsule my be generally more robust and so may be more safely stored and handled (generally thicker film on the capsule), but such capsule also possessing a smaller area (window) of weaker, thinner film which can give rise to quicker release characteristics by the thinner film wall dissolving more quickly when exposed to any given solvent. An advantageous differential film thickness to form a capsule with wall of different thickness, could be e.g. 70/90 micron film coordination to produce capsules which are robust but which release their contents quickly, through a window of thinner film.

Therefore films of different thickness may be used in the enrobing process, and to give a further examples, a film of greater thickness may be used in the first stage of the enrobing process, a maximum of 200 microns and a minimum of 70 microns but say preferably 125 microns thickness and a film of lesser thickness may be used in the second stage of the enrobing process, a maximum of 125 microns and a minimum of 50 microns, but say preferably 80 microns thickness.

When making multiples of enrobed compacted powder slugs, the spacing of the compacted powder slugs can be important. If the compacted powder slugs are positioned too closely together, the film is not able to fully thermoform between them. For example, a spacing between the adjacent compacted powder slugs of about 4 mm has been found to give good results, the film being able to fully adopt the vertical sidewall of the compacted powder slug to a distance of about 2 mm before it begins to curve away from the side of the compacted powder slug.

The application of vacuum to thermoform multiples of enrobed product limits the differential driving force available to deform the film to that of atmospheric pressure (1 Bar). The application of positive pressure alone or in combination with vacuum to rapidly deform the film by increasing the pressure differential across the film surfaces provides the ability to form adjacent pockets with a deeper profile and/or reduced spacing of adjacent product. Further the application of heated compressed air assists to minimize the cooling effect of thermodynamic expansion of a compressed gas.

According to one aspect of the invention, the method involves forming two separate overlapping half coatings of film, effectively on the compacted powder slug. The method preferably involves, first forming a film in a pocket, then compacting a powder slug into the film lined pocket, thereby effectively coating/encapsulating a substantial portion of a powder slug within a film formed into a partial capsule, removing the remaining film material not coating the compacted powder slug e.g. by cutting, then coating half of the compacted powder slug, with overlapping portions of the two coatings sealed together to provide a sealed complete enclosure for the slug, and again removing remaining surplus film material not coated on the slug. It may be necessary to apply adhesive material between the overlapping film coatings e.g. to the surface of the film layers, to ensure the formation of an effective seal therebetween and to make the resultant capsule tamper-evident. Inkjet formulation is preferably a solvent, rather than a diluted version of the film. It is applied at sufficient quantity to partially dissolve the surface layer of the film. A currently preferred formulation has the composition: Benzyl alcohol 62%, Denatured ethyl alcohol 31%, Potassium acetate 5%, DI water 2%. In other embodiments, the adhesive material conveniently has the same composition as the film, but with a greater proportion of plasticiser, e.g. 93% to 98% by weight plasticiser, so as to provide a less viscous material. The adhesive material may be applied, e.g. by use of a roller, spraying etc. Another exemplary adhesive formulation has the composition by weight %: HPMC 4%, lactic acid 77%, water 19%. The compacted powder slug and capsule conveniently include a generally cylindrical side wall portion, with two half coatings overlapping on this side wall. Tablets of circular symmetrical form with a circular cylindrical side wall are very common, but other forms e.g. generally oblong and oval, again including a generally cylindrical side wall, are also known.

It may be also advantageous or desirable to apply adhesive material e.g. as described above, to the surface of compacted powder slug prior to the final stage of coating, to promote adhesion of the second portion of the film thereto. Again, this may be achieved by e.g. use of a roller, spraying etc.

A plurality of tablets in an array may be conveniently coated simultaneously, using a suitably large sheet of film material.

BRIEF DESCRIPTION OF THE DRAWINGS

Embodiments of this invention are now further described in detail, by way of example only, with reference to the drawings in which:

FIG. 7C shows plan view of a front face of the lower piston, FIGS. 7D and E show cross-sectional views of the piston taken along Y-Y and X-X as shown in FIG. 7C, and FIG. 7F shows the section indicated by dashed circle in FIG. 7B in more detail of the concave shape in front face of piston and square edges;

FIG. 8B shows the section indicated by dashed circle in FIG. 8A in more detail of the recessed surface around the cavities and raised edge around cavities, also the vacuum holes around the cavities;

FIG. 9B shows the section indicated by dashed circle in FIG. 9A of the raised edges around the cavities;

FIG. 13C shows the section indicated by dashed circle in FIG. 13A;

FIG. 15B shows a perspective view of the underside of the assembled unit of the thermoformer of FIG. 15A;

FIG. 16B(i)-(ii) show schematically how the a film may be formed through an opening in a spacer plate;

FIG. 16D shows a perspective view of the cutter of the combined transfer and cutting tool; FIG. 16E shows the combined transfer and cutting tool in assembled form;

FIG. 17B shows the dosator powder bowl shown in FIG. 17A in more detail and FIG. 17C shows the dosator head shown in FIG. 17A in more detail;

FIG. 18B shows a dosing unit shown in FIG. 18A in more detail, and FIG. 18C shows the dosator dosing head shown in FIG. 17C charging the dosing unit shown in FIG. 18B;

FIG. 18E shows a further perspective view, from below, in the absence of a platen; FIG. 18F shows a schematic plan view of the spray jets in operation;

FIG. 22B shows a cross-sectional view taken along A-A of the gasket in FIG. 22A, FIG. 22C shows a cross-sectional view of the gasket positioned in a transfer arm with tablets and FIGS. 22D-E show cross-sectional views of the platen assembly and the gasket.

DETAILED DESCRIPTION

The drawings show the various stages of a powder compaction/enrobing process.

Figure 1:
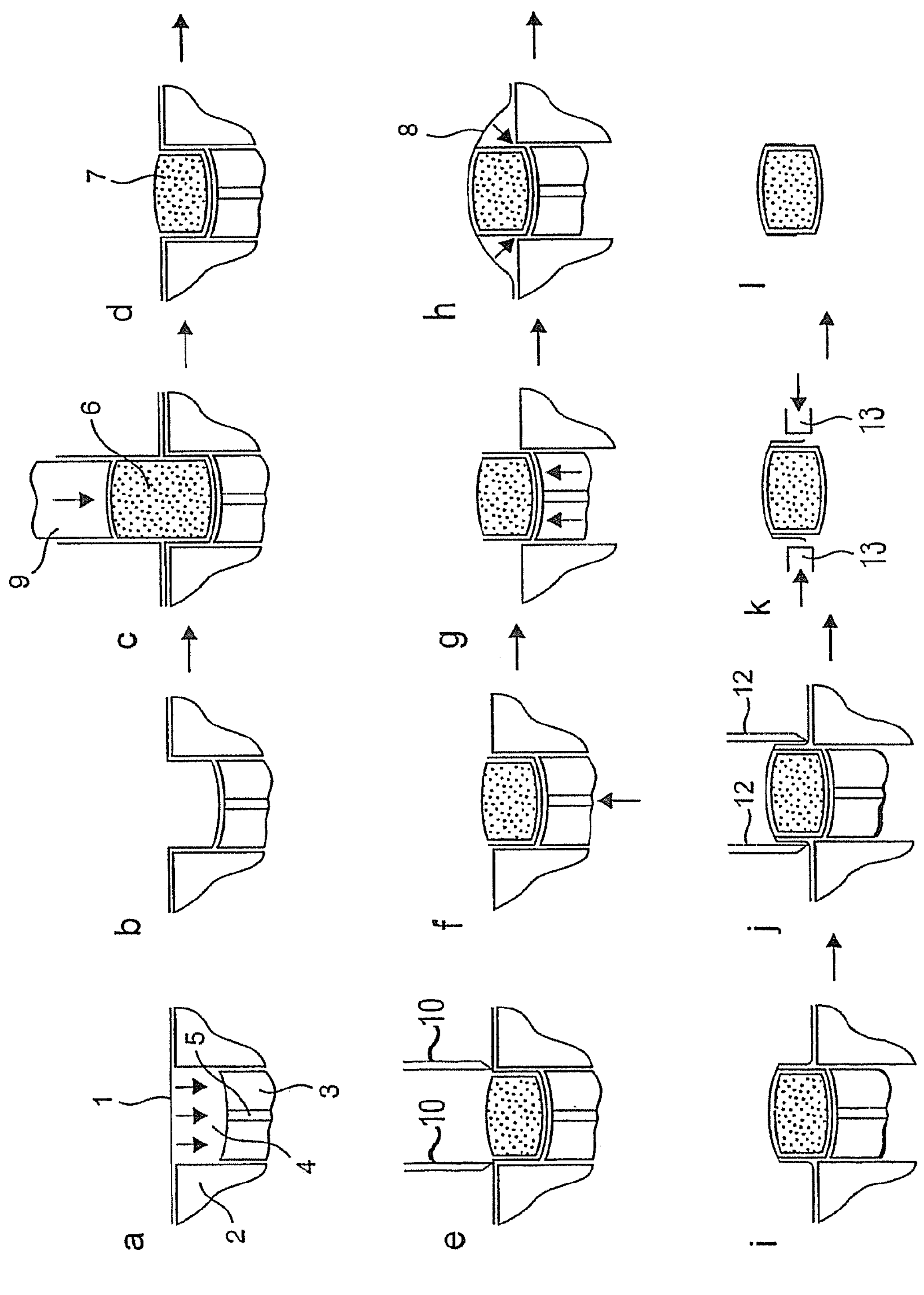
FIG. 1 shows in steps a-l the basic compaction and enrobing apparatus and process in accordance with an embodiment of the invention.

FIG. 1 shows the mechanism of the basic steps of powder compaction and enrobement via steps a-l:

a. A first film (1) is laid upon a platen (2). Lower piston (3), slideable in cylinder (4) incorporates vacuum port (5).

b. Film (1) completely drawn down into cylinder (4) by a vacuum created by vacuum port (5) and said film (1) also resting on the crown of lower piston (3), to form a pocket shape.

c. A quantity of powder (6) is introduced over the pocket of film and upper piston (9) moves downward towards the lower piston (3) compressing a quantity of powder (6).

d. A compacted powder slug (7) resulting from the completion of step c.

e. Cutting of film by the introduction of cutting tool (10) to form an isolated semi enrobed slug of compacted powder. While this figure shows a separate cutting tool, preferred embodiments use the compaction pistons to compact the powder and punch cut the film, as will be described in more detail hereinafter.

f. Lower piston (3) begins to move upwards, thereby also urging compacted powder slug (7) upwards.

g. Lower piston (3) comes to rest, positioning compacted powder slug (7) proud of platen (2).

h. Introduction of a second film (8) over platen (2) and also loosely stretching over compacted powder slug (7).

i. Second vacuum is applied drawing second film (8) around and closely in association with the upper portion of compacted powder slug (7), second film (8) thereby wrapping itself around the upper part of the compacted powder slug (7).

j. Cutting tool (12) descending and trimming off excess unwrapped film from powder slug (7).

k. Fully enrobed powder slug, has been ejected from cylinder (4) by the further upward movement of lower piston (3) and has the loose ends of the films ironed and sealed by irons (13).

l. Shows a fully enrobed tablet with ironed seams.

Figure 2:
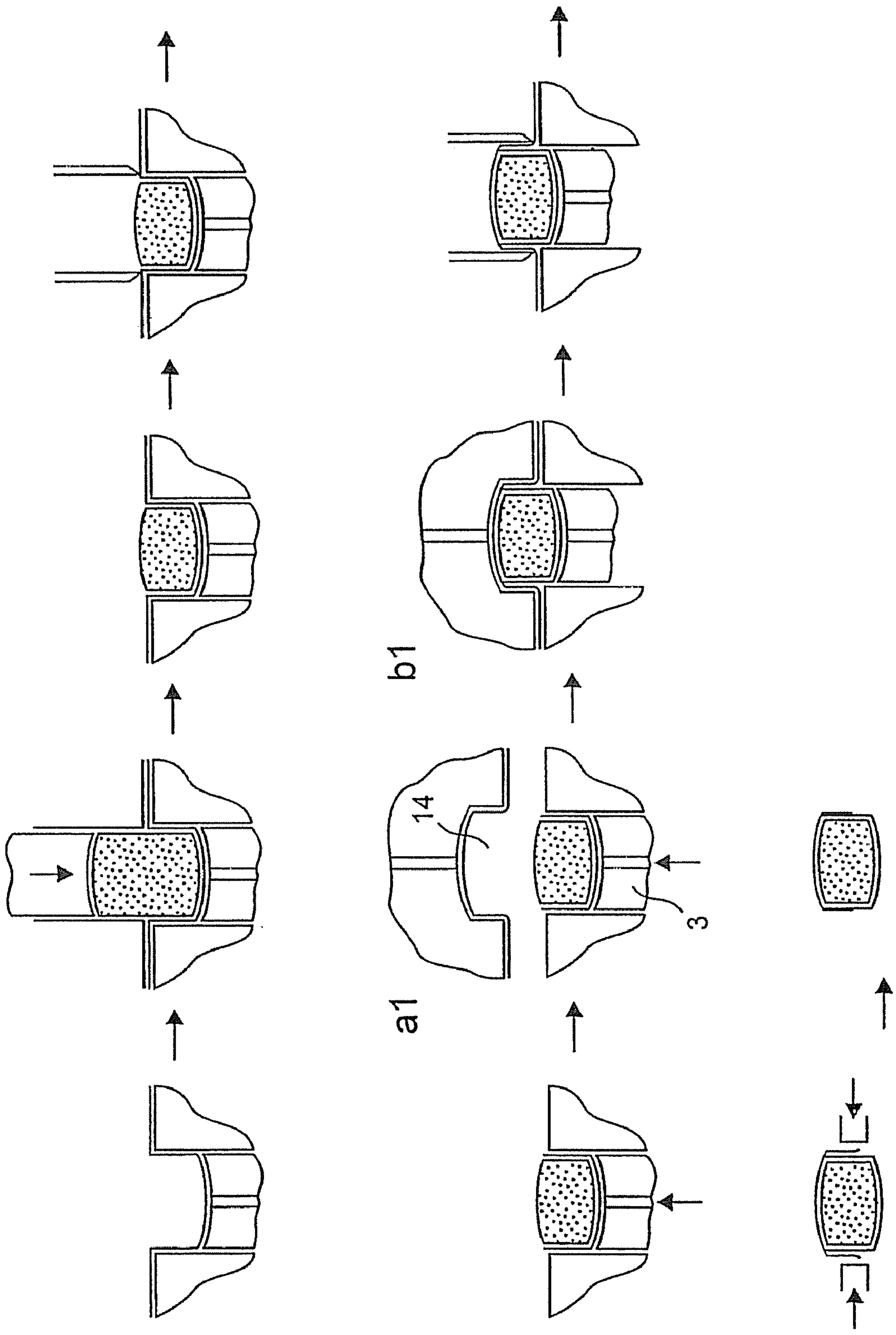
FIG. 2 shows a variation of the method shown in FIG. 1 with steps a1 and b1 in accordance with an embodiment of the invention.

FIG. 2 depicts a variation of the basic process described by FIG. 1.

Steps a1 and b1 show a second pre-formed film pocket, formed by a second vacuum forming pocket (14) being lowered onto the platen immediately above a partially enrobed powder slug as shown in step f of FIG. 1. Once the opposing film pocket is in position, lower piston (3) moves upwards thus pushing compacted partially enrobed powder slug also upwards and into the cavity of the second pre-formed film pocket, thus capping the partially enrobed powder slug to form a fully enrobed capsule, enrobed by two pockets of film. The capsule is then released, trimmed and ironed as mentioned previously.

Figure 3:
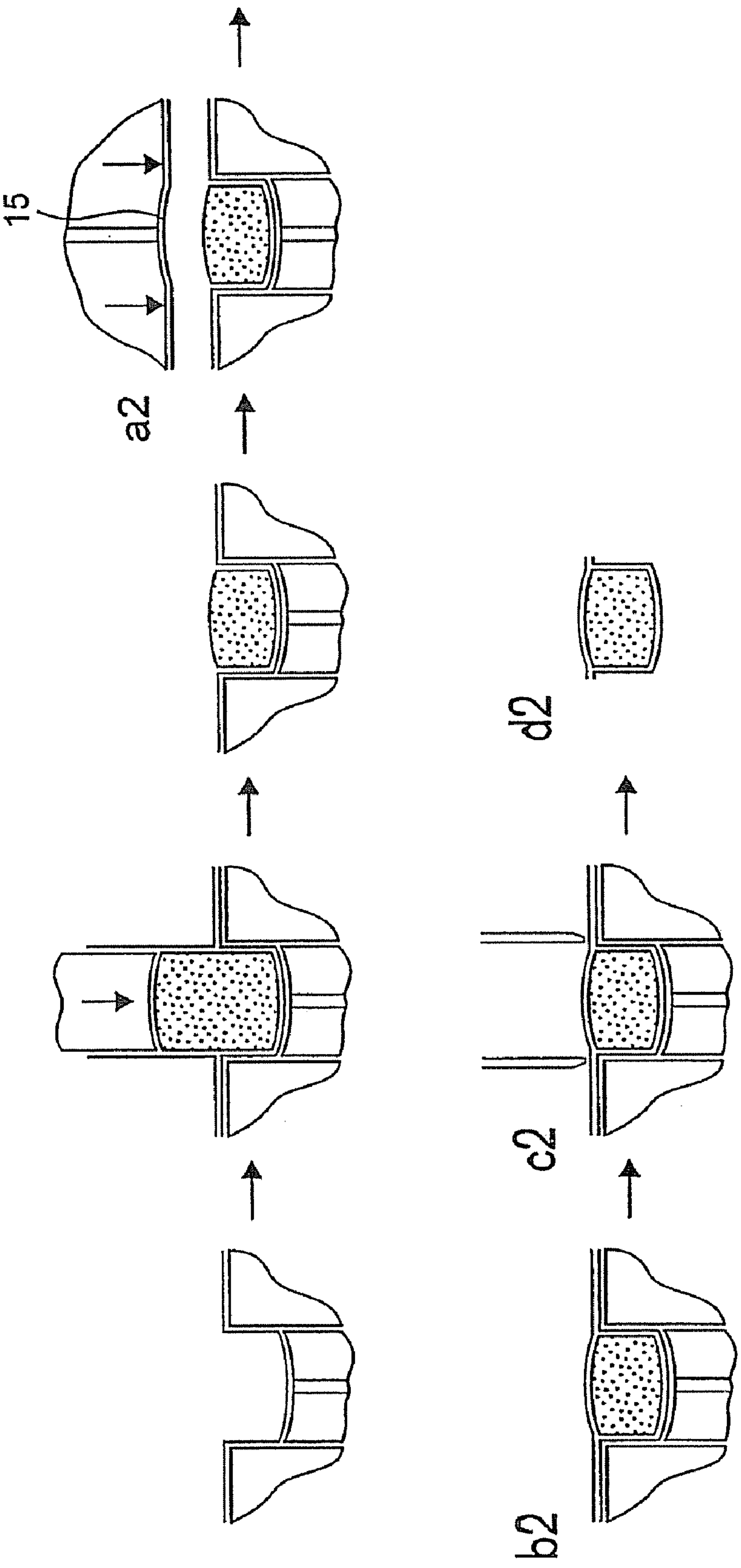
FIG. 3 shows a variation of the method shown in FIG. 1 with steps a2-d2 in accordance with an embodiment of the invention.

FIG. 3 depicts a further variation of the basic process described by FIG. 1.

Step a2 shows a powder slug as in step f of FIG. 1, and like FIG. 2 a second pre-formed film pocket is introduced, but this time it is a shallow pocket, formed by a second shallow vacuum forming pocket (15), such to only coat the top of the powder slug and to form a seal at the circumference of the very edge of the cylindrical portion of the powder slug. Steps a2-d2 show this revised process. This process gives rise to a capsule with a different type of seal which gives rise to different properties in the capsule.

Figure 4:
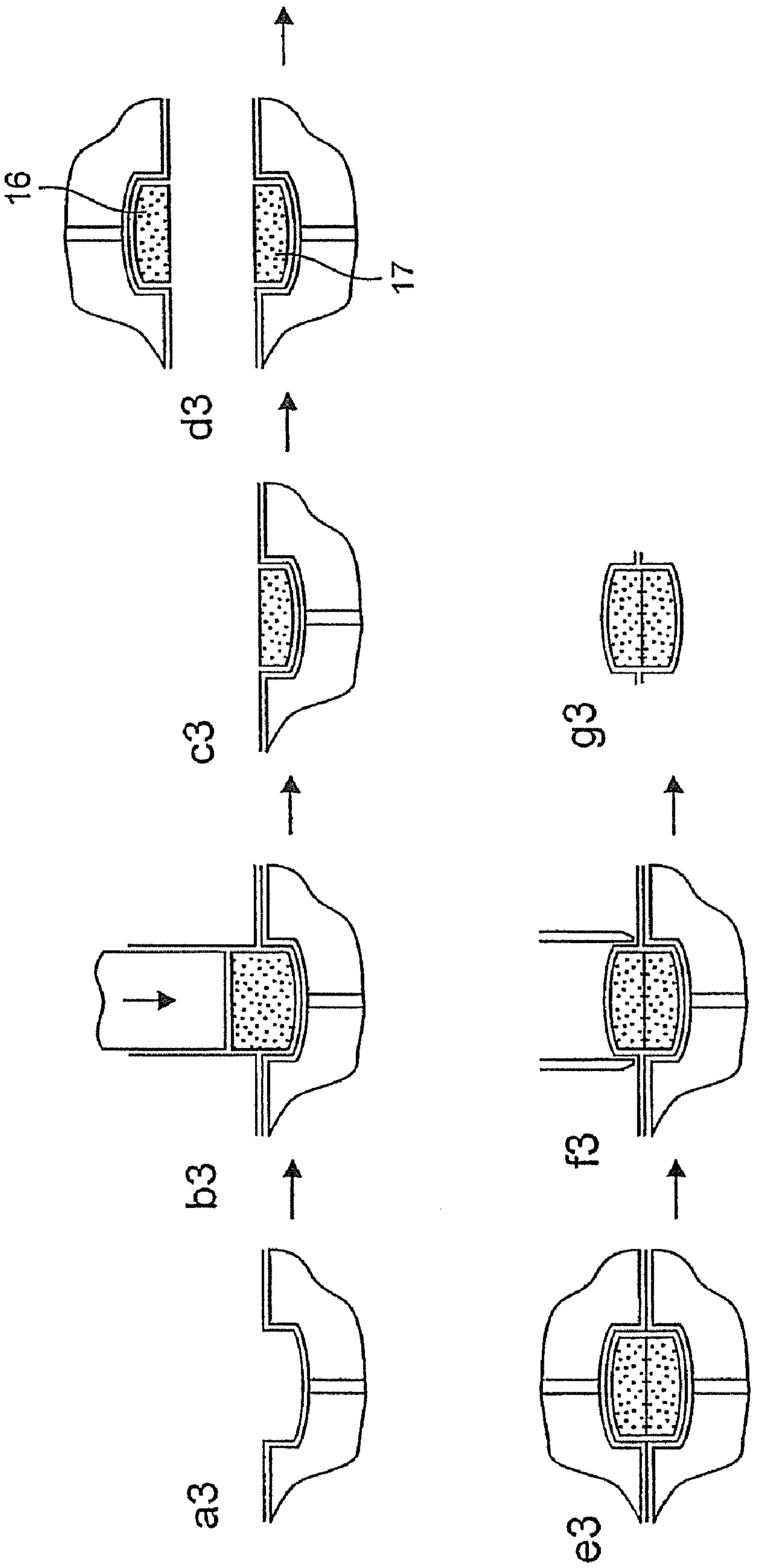
FIG. 4 shows a variation of the method shown in FIG. 1 with steps a3-g3 in accordance with an embodiment of the invention.

FIG. 4 depicts another variation of the process described by FIG. 1.

However the basic process is essentially duplicated to form a capsule which contains two distinct half doses of powder. The basic process as described in FIG. 1 is carried out up to step f, in duplicate, which is basically steps a3-c3 in FIG. 4. The main differences at this point in FIG. 4, are that the two opposing pockets filled with compacted powder (16,17) are half size in depth, and the top of the powder slugs are essentially flat, rather than rounded. Step c3 may include the laying down of an intermediate film on the surface of the half slug. Steps d3-f3 show the bringing together of 2 half slugs to form a single capsule, comprised of 2 parts. Step g3 shows a compartmentalized capsule. The advantages are at least 2 separate doses of active ingredients can be incorporated into 1 capsule, under perhaps different compaction pressures etc. This gives rise to further flexibility and options as to the performance of the new dosage forms.

In certain ones of the processes described, it is possible to facilitate the formation of powder slugs having various levels of compaction by controlling the quantity of powder used and/or the careful positioning of the co-acting pistons during the compaction process. As previously mentioned, these varying levels of compaction are possible in the powder slugs because the slugs are enrobed within a film, and this film enrobement can provide the slug with the necessary integrity it needs so that it can function as a convenient and stable dosage form. The process and apparatus can be modified to produce capsules with varying properties, which have advantages over conventional tablets and conventional capsules already known in the art. For example, a capsule according to an embodiment of the present invention containing a powder with a low compaction, could produce extremely favourable quick release characteristics, suitable, e.g. for a fast acting analgesic; the film can be both designed to be smooth/flexible, to allow the capsule to quickly and relatively painlessly travel to the intended site of drug delivery through the digestive tract, and also be designed to dissolve at or near the intended site of drug delivery. The lower compaction of the powder in the capsule can also aid smooth travel of the capsule in the digestive tract, as the contents of the capsule can be designed to be compressible and mobile, thus allowing the capsule to be bent and/or compressed as it travels through the body so that it can conform to the shape of a more restricted part of a passage, squeeze through it and so continue its journey through the digestive tract with less hindrance. Such dosage forms may find themselves especially useful where a patient finds difficulty in swallowing, has a painful or restricted digestive tract, or there is some other reason why a dosage form is required to be more mobile and less aggressive to the internals of the body.

The following methods are given by way of example and it is not intended to limit the invention in any way:

Example 1

Consumable Items

Film 1—may be in the general region of 125 microns thickness, or more preferably about 120 microns, HPMC plasticised with lactic acid 15.25%, and triethylcitrate 10%, and processing aid microcrystalline cellulose 1%

Film 2 is substantially the same as film 1. In certain embodiments, film 2 may be of lower thickness. The thickness can be in the region of 80 micron thickness, but is more preferably about 100 microns.

Glue applied to overlap area of first film—Benzyl alcohol 62%, Denatured ethyl alcohol 31%, Potassium acetate 5%, DI water 2%.

Process Description

Film 1 is thermoformed into single or multiple tablet/caplet shaped pockets in a platen, each pocket containing a lower piston that can be raised or lowered as necessary to suit standard sized tablets and caplets. The tablet shaped pocket also has a raised edge profile around the top perimeter of the pocket. This edge profile is raised 1 mm above the platen surface and has an upper flat with a land width of in this example 0.35 mm or a predetermined dimension of similar order of magnitude. The vertical sidewall of these pockets is typically 3 mm deep.

The thermoforming operation involves the film acting as a membrane dividing the two halves of a vacuum chamber, which are separately controlled. The chamber above the film contains a flat heated platen at a temperature of approximately 140-145° C. Vacuum is drawn above the film causing it to be held against the heated plate far a period of 1 to 5 seconds, preferably 1.2 seconds. Once the vacuum level in the lower chamber reaches at least 0.94 bar (−94 kPa) the vacuum in the upper chamber is released to atmosphere or replaced by positive pressure for a 1.2 second duration. This applied pressure differential forces the film downwards away from the heated platen and onto the tablet pocket shaped tooling below. In this way the film adopts the shape of the tablet pockets in the lower tooling.

In one embodiment, the thermoformer may additionally pre-heat the film (i.e. before the 1.2 second contact). In a preferred pre-heating step, the heated thermoformer plate is positioned over the film without contacting the film for a predetermined period (e.g. 3 seconds).

Powder Dosing and Film 1 Cutting

A powder dosing and compaction assembly is then placed over the film formed pocket. A dosator deposits a dose of powder into a slider mechanism of the dosing and compaction assembly, which transfers the powder into the film pocket. In the preferred embodiment, compaction and cutting of the film is achieved via a compaction piston that advances to a fixed stop after the film is cut.

The level of compaction is controlled by the mass of powder being deposited into the dosing sleeve, and the depth of the formed film cavity. As the compaction piston is advanced it causes a punch cut through the film as it interferes with the inside edge of the raised edge profile. The compaction and punch cut occur in one continuous movement to the fixed stop position.

The fit tolerance between the cut piston and the internal dimensions of the raised edge pro profile are such that the diametric clearance no more than 35 microns.

The apparatus is generally of stainless steel, with the piston crowns made of hardened steel. The equipment was machined and supplied by Midland Tool and Design, Birmingham, UK.

Second Film Application, Cut and Iron

The partly enrobed core is then raised upwards within the tooling, such that half of the formed tablet sidewall is above the raised edge profile. Glue is applied around the perimeter of the first formed film adhering to the sidewall of the tablet and/or to the second film to be thermoformed. Typical glue levels of the order of 20 gsm are applied to its surface via some suitable device. In the preferred embodiment, glue is applied to the first film on the sidewalls, rather than to the second film. Typically, 15 gsm is a minimum applicable amount of glue.

The film is then thermoformed in the same manner described for the first film, except that the film is held above the tablets by a barrier (spacer) plate 188, such that the positioning of the film does not damage the top surface of the tablet. It is possible to use a lower temperature (say 50-170° C., preferably 140-165° C.) for the second thermoform. In the preferred embodiment, the thermoformer plate contact heats the film for 1.5 seconds, thermoforms for 1.5 seconds. This over process limits the heat exposure of the powder surface). The second cut is performed by a combined transfer and cutter tool designed such that a cutter part forms a punch cut on the outside edge of the raised edge profile of the lower tooling. A diametric fit tolerance for cutting is say 25 microns, with acceptable ranges between 17-36 microns, for the width of a lozenge shaped dosage form, and say 31 microns, with acceptable ranges between 20-42, for the length of a lozenge shaped dosage form. The waste film web is then removed and the fully enrobed powder core is pushed through a tight fitting tablet shaped ironing unit (heated orifices) at say 40-60° C. to ensure the overlap seal is formed.

Example 2

Same conditions as Example 1, but the following step replaces "Powder dosing and film 1 cutting" stage:

Powder Dosing and Film 1 Cutting

A dosing assembly is then placed over the film formed pocket. This consists of a location mask which sits on location dowels in the platen, and a dosing sleeve that rests directly above the film formed pocket, and sits on the raised edge profile. The dosing sleeve exactly matches the dimensions of the film formed pocket. A dose of powder is deposited into the dosing sleeve and falls into the film pocket. The cut is achieved via the cut piston that acts through the dosing sleeve and sweeps any residual powder down into the film pocket below. The level of compaction is controlled by the mass of powder being deposited into the dosing sleeve. The cutting piston cuts through the film as it interferes with the inside of the raised edge profile. The cut piston continues to engage with the raised edge for a further 0.2 mm, and in so doing compacts the powder further into the film shell. The fit tolerance between the cut piston and the internal dimensions of the raised edge profile are such that the diametric clearance is no more than 25 microns.

The apparatus is generally of stainless steel, with the piston crowns made of hardened steel. The equipment was machined and supplied by Midland Tool and Design, Birmingham.

The tablet is thus pushed down by the cut piston into the confines of the pocket, and comes to rest on the lower piston. The location mask and dosing sleeve and the waste film web are then removed.

Example 3

Same as example 1, but the tolerance fit for the first cut piston is the same as that for the second cut piston.

Example 4

Same as example 2, but the tolerance fit for the first cut piston is the same as that for the second cut piston.

Figure 4A:
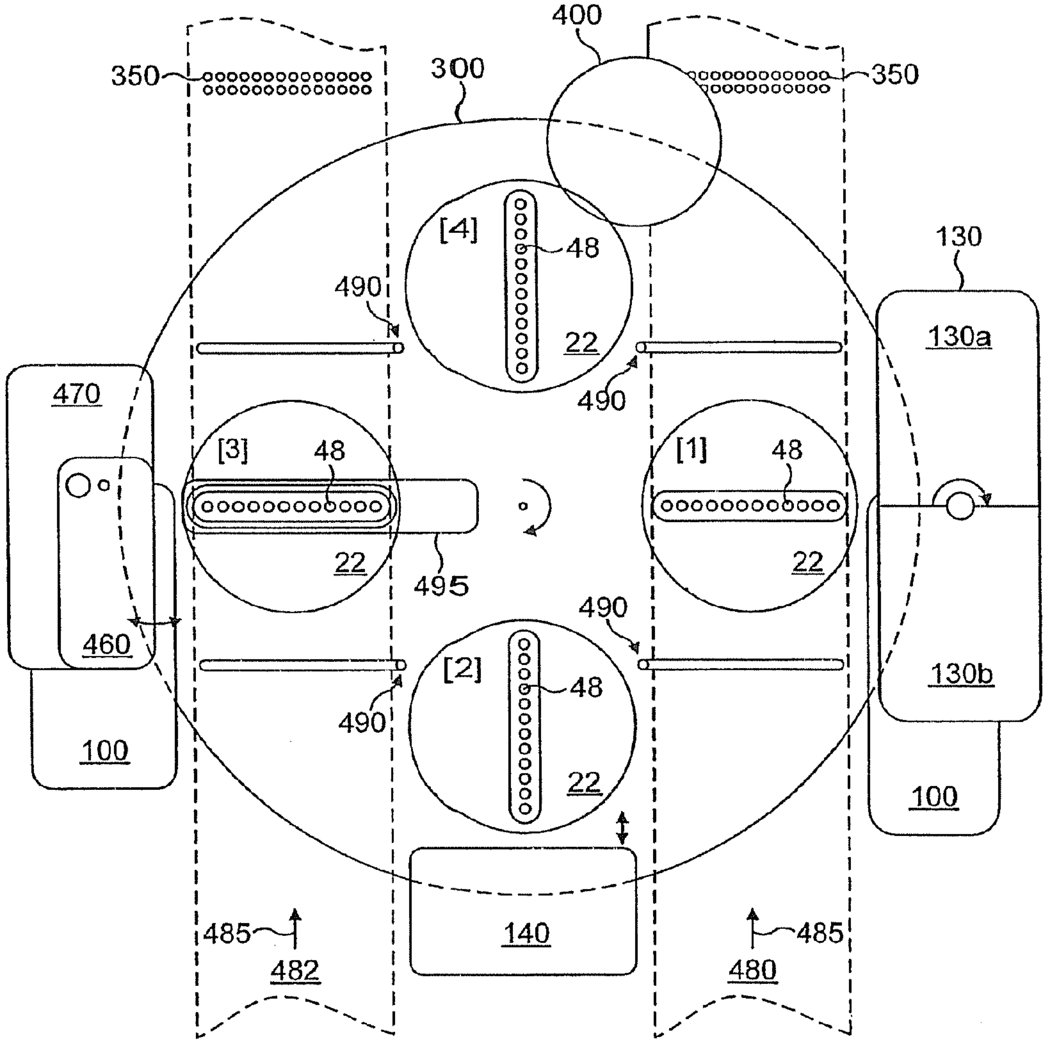
FIG. 4A shows a schematic plan of turntable apparatus embodying the present invention.

Further description of exemplary apparatus features and processes used for accurately dosing and compacting powder through to collection of the fully enrobed powder slugs is provided. The apparatus used in the above process consists of the following assemblies:

A. Platen assemblies containing cavities in which the powder slugs or tablets are formed.
B. Thermoforming units.
C. A powder dosing and compaction assembly.
D. An inkjet assembly.
E. Transfer arm and cutter assembly
F. Ironing unit
G. Platen cleaning unit Overview of preferred Rotary Equipment As will be described in more detail hereinafter, various processes preferably occur on a turntable 300 (as shown in plan view in FIG. 4A) supporting the platens 22 and first and second films 480,482.

The turntable is rotatable to cause each of a plurality of platens to move between four operating stations [1-4]. The films 480, 482 are supplied from known types of rolls and are indexed across the surface of the turntable in the direction of arrows 485 after each enrobe process. Thus in the example shown in FIG. 4A fresh film is supplied from up stream (the lower part of the page) and waste film webs, riddled with holes, move down stream (towards the top of the page).

Figure 4B:
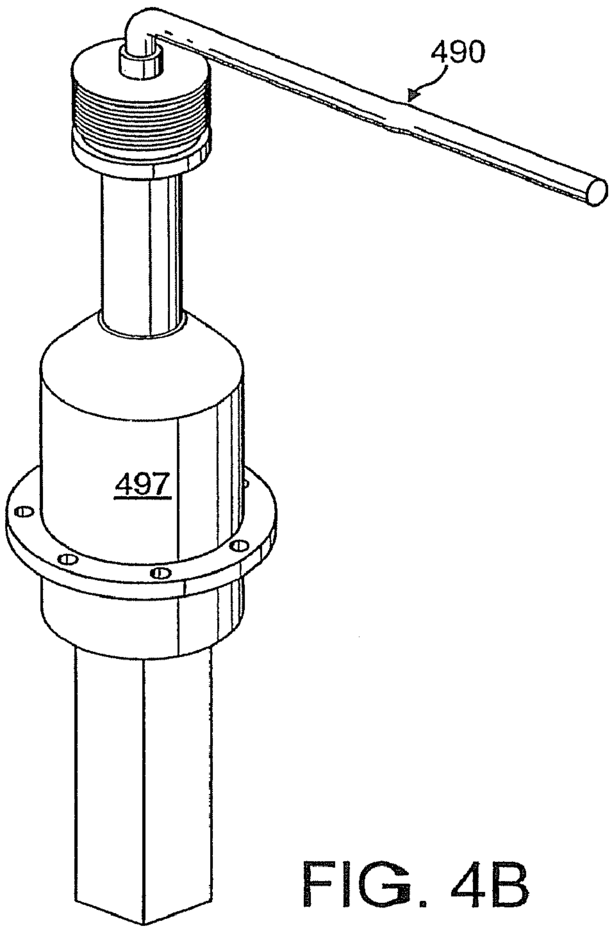
FIG. 4B shows a film lifter assembly of a type used in the embodiment of FIG. 4A.
Figure 5A:
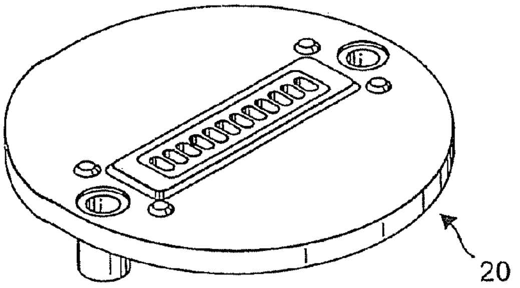
FIG. 5A-B shows a top view (filmside) and bottom view, respectively, of a platen assembly in accordance with an embodiment of the invention.
Figure 5B:
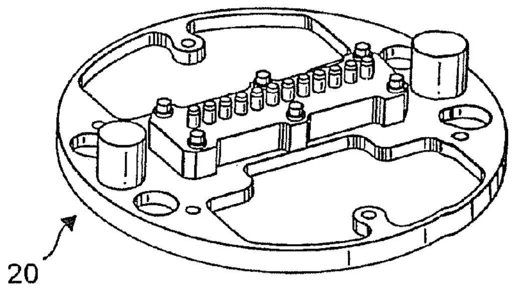
Figure 6A:
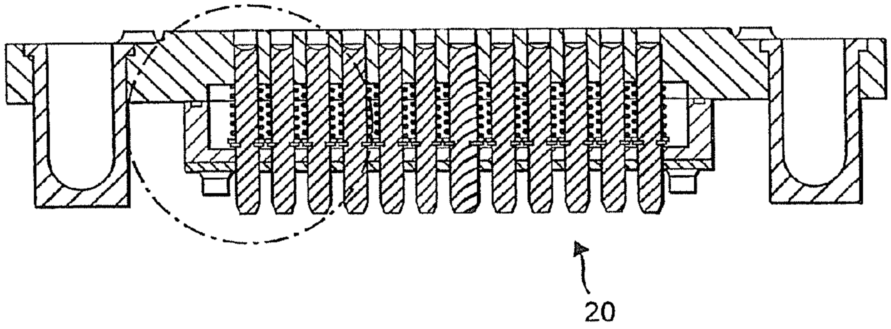
FIG. 6A-B FIG. 6A shows a cross-sectional view of the platen assembly of FIG. 5A taken along the arrow shown in FIG. 5A in accordance with an embodiment of the invention and FIG. 6B shows the section indicated by dashed circle in FIG. 6A in more detail.
Figure 6B:
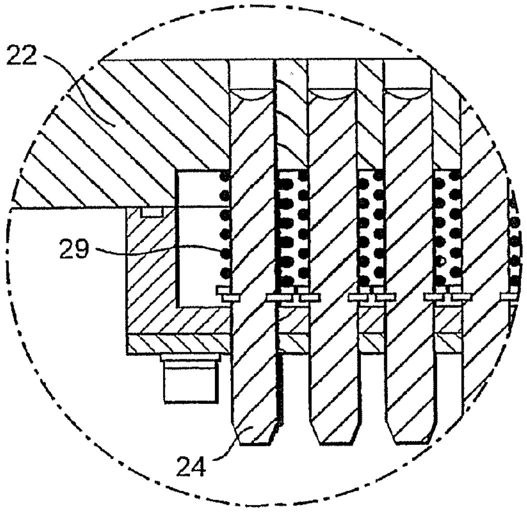

The turntable is provided with a plurality film lifters 490 (see also FIG. 4B). In this example there are four film lifters, one on the upstream and one on the downstream side of each station performing film forming and cutting step a. The film lifters are bars deployed beneath the films in the same plane as the platen surfaces and extending substantially across the breadth of the film transverse to its direction of flow. The lifters are moveable relative to the platen surfaces such that they can be below (or flush with) the platen surface, thereby allowing the films to rest on the platen surface, or above the platen surface, causing the films are stripped from the platen surface. Moving the lifters in relation to a platen can be achieved by one more of (i) raising relevant lifters by means of the lifter drive mechanism 497 or (ii) lowering the platen. In this way it is possible to detach the waste film webs from the platen surfaces and lift the remainder of the films clear so the turntable can be rotated and or the film indexed onwards. It is preferred in the detaching step that the relative movement of the lifters and the platen may accentuated by a movement of the lifters and the platen in opposition directions.

Station One [1] is the insitu compaction station at which the powder slugs are compacted into the film pockets in the first of the two enrobe processes. To achieve this at station [1] a thermoformer 100 can move itself to a position over the first film 480 and the platen 22, as too can the powder dosing and compaction units 130*a*/*b*.

A fresh portion of the film 480 is preconditioned by the thermoformer and "formed" into respective pockets (cavities) in the platen with the assistance of pressure and or vacuum. The film pockets are then filled by an insitu compaction step using compaction pistons as described hereinbefore to produce partially enrobed powder slugs/tablets. The partially enrobed powder slugs are cut from the web of film by a continued movement of the compaction pistons before the lifters strip the waste film from the platen and the turntable rotates to take the platen to station [2].

Station [2] is provided with a precision jet spraying assembly 140 (based on well known inkjet technology) for applying adhesive to the partially enrobed powder slug. In this exemplary process the adhesive is applied to the side walls and so the powder slugs are raised in relation to the platen by means of the lower pistons 24 and a piston drive mechanism described in more detail hereinafter. When the adhesive has been applied the turntable rotates to take the platen to station [3].

Station [3] performs the second enrobing step in which the second film is "formed" by directly onto the partially enrobed powder slugs which have been prepared with adhesive. At station [3] there is provided a thermoformer 100, a transfer and cutter arm 460, and a barrier plate 495 (also referred to herein as "spacer plate"). As will be described in more detail the barrier plate is disposed between the film to be conditioned by the thermoformer and the partially enrobed powder slugs. Since the film needs to be formed directly onto the powder slugs the barrier plate is provided with an opening to allow the film to be formed though it with the assistance of pressure and/or vacuum. In use the barrier plate 495 locks the film 482 in position against the heated surface of the thermoformer 100 and protects the partially enrobed powder slugs from heat and/or physical damage. Once the film has been formed onto the partially enrobed powder slugs, the waste film web is cut away from the completely enrobed powder slugs by action of a combined transfer and cutter tool 460. This arm performs the second film cutting action described in detail hereinbefore and is also used to transfer the completely enrobed powder slugs to an adjacent ironing tool 470. The transfer and cutter arm 460 is thus a single device operable to perform the cut and transfer operations at stage [3]. As will be explained in more detail hereinafter, the cutter of the arm is provide outwardly facing bores with cutting edges and is provided on its inwardly facing surface with a transfer gasket. In use, the cutter continues its motion toward the completely enrobed powder slugs so as to completely accommodate them in its bores and, further, to an extent which ensures they become press-fitted in to the transfer gasket from the cutter side. The transfer and cutter arm 460 can then swing to a position below the ironing tool 470 where upwardly mobile pusher fingers provided on a movable support are used to push the enrobed powder slugs out through the transfer gasket (opposite side to cutter) and up into the ironing tool 470. The fingers halt the upward movement for a period, to allow the seams of the enrobed slugs to be ironed, before continuing their upward movement and to push the finished powder slugs/tablets out above the ironing tool for collection.

Finally, the platen is rotated to station [4] where it is cleaned by cleaning unit 400 ahead of a new process cycle.

Preferably, the various steps in the process are performed simultaneously on different platens. In other words four process cycles are performed simultaneously. In this case the lifters are employed regularly in the sense that two stations [1], [3] perform film forming steps between every rotation.

Description of Platen

Views of the complete platen and piston assembly 20 are shown in FIGS. 5A-B and FIGS. 6A-B.

Figure 8A:
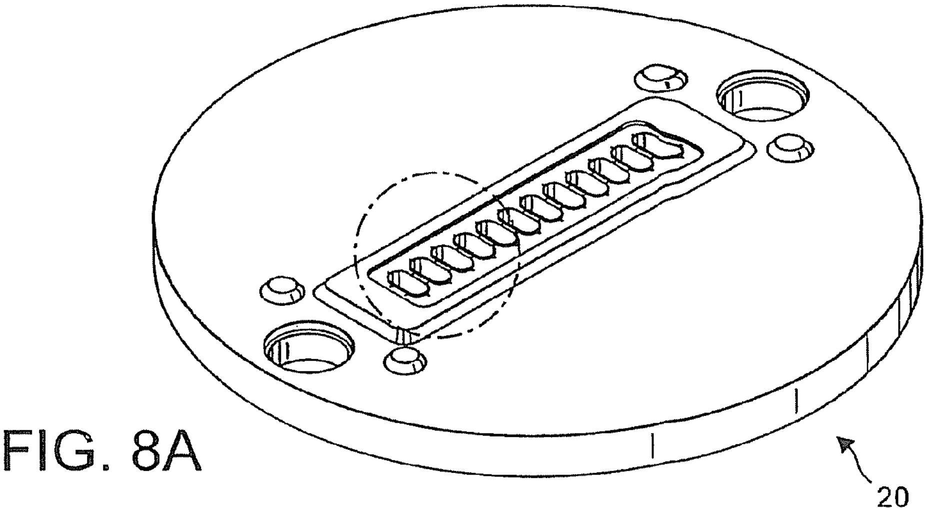
FIG. 8A-B FIG. 8A shows a perspective view of a lower platen in accordance with an embodiment of the invention.

Each platen 22 consists of a stainless steel plate with a surface that contains a row of cavities 48. The cavities have vertical sidewalls and the same cross sectional shape as the tablets that are to be formed, see FIGS. 8A-B and 9 A-B. There is a raised edge 44 around each cavity 48 with the section shown in FIGS. 8B and 9B. This feature is for the process of cutting the film that is formed over the tablet in the second part of process. Also note the recessed surface 42 that protects the raised edge and supports the film above the edge prior to first thermoforming operation.

The base of each cavity is formed by the surface 32 of a piston 24. Each piston is a close fit (maximum diametric clearance of 25 microns) in its respective cavity and is held securely downwards into the bottom of the cavity by a compression spring 29 fitted around the stem of the piston. The spring force presses the end of the stem onto the surface of a cam which is used to control the vertical position of the piston and hence the depth of the cavities.

Details of the piston shape are shown in FIGS. 7A-F. Note the concave recess in the front face 32 of the piston 24 and the square edge 34 around the recessed face shown in FIG. 7F.

Figure 7C:
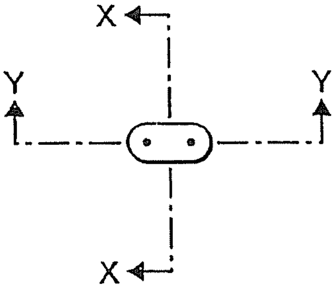
FIG. 7A-F show a lower piston in accordance with an embodiment of the invention, where FIGS. 7A and B show perspective views of the lower piston.
Figure 7E:
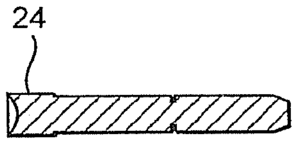
Figure 7D:
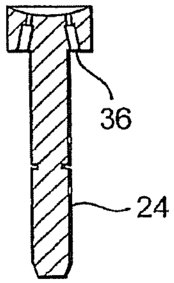
Figure 7A:
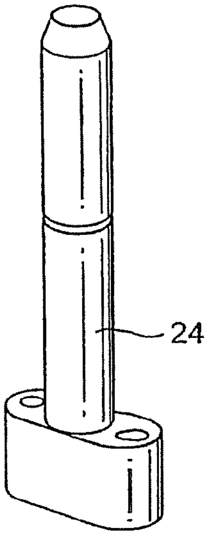
Figure 7B:
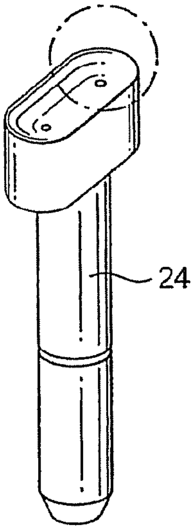
Figure 7F:
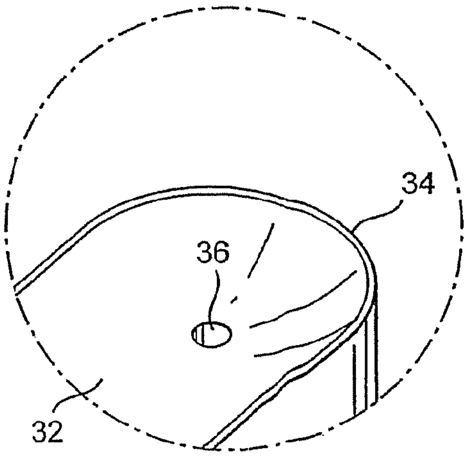
Figure 8B:
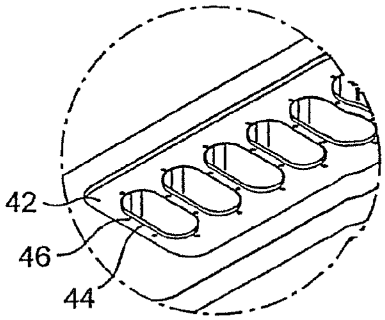
Figure 9A:
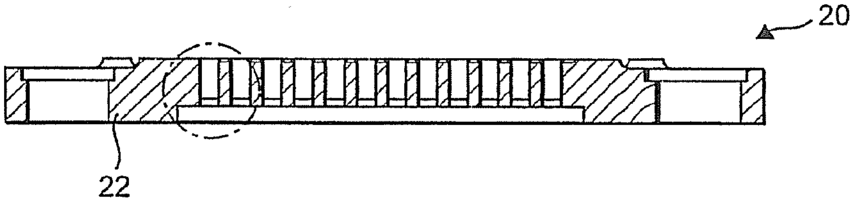
FIGS. 9A-B FIG. 9A shows a cross sectional view of the lower platen of FIG. 8A in accordance with an embodiment of the invention.
Figure 9B:
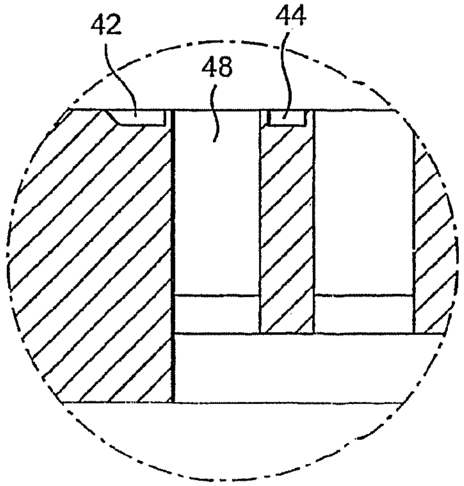

Both the pistons and the platen have small holes 36,46 (approximately 0.5 mm diameter) in them to allow a vacuum to be created in and around the tablet cavities during the two thermoforming processes that form part of the process. The vacuum holes 46 in the platen are shown in FIG. 8B and the vacuum holes 36 in the piston are shown in FIGS. 7A,B,C,D and F.

While the lower pistons of the platen are preferably stationary at the first station, they are used to raise the powder slugs for example at station [2], for gluing, and at station [3], for the second enrobe step.

Description of Powder Dosing and Compaction Unit

The described embodiment provides a rotatable powder dosing and compaction assembly 420, which assembly is provided with two powder dosing and compaction units 130*a*, 130*b*. Thus, in use, when one unit 130 is filling the other is dispensing and compacting.

A dosator mechanism supplies powder to each powder dosing and compaction unit 130*a*, 130*b* from a bulk powder supply. A powder dosing and compaction unit has three functions:

a. To receive powder doses from the dosator and transfer them to the compaction cavities.

b. To compress the powder into the cavities.

c. To cut the film that has been formed into the cavities and thus separates it from the 'waste' film.

Figure 10:
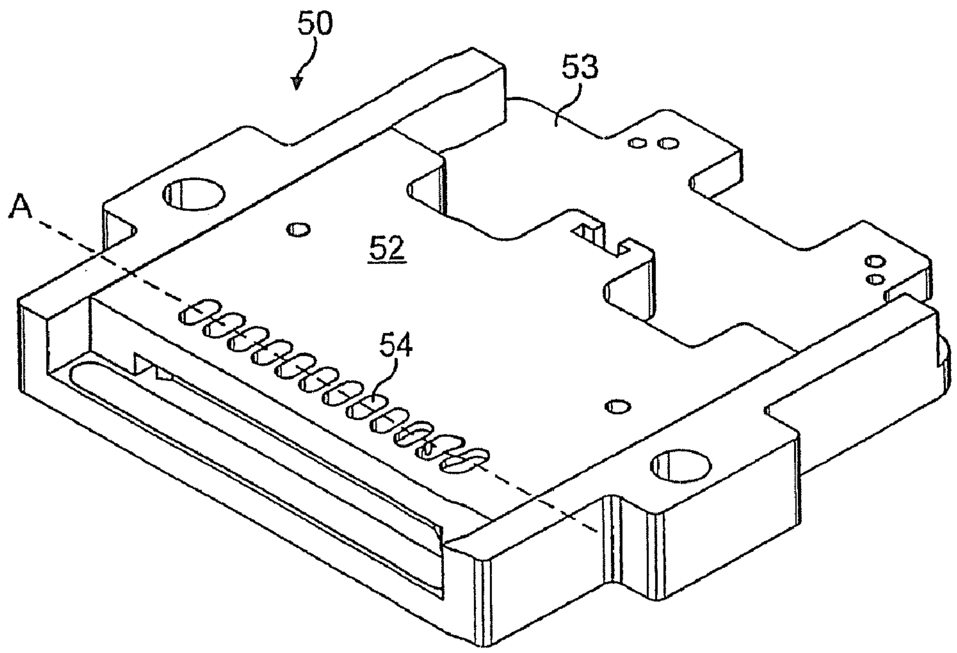
FIG. 10-11 show perspective views of a slider mechanism for a dosing unit in accordance with an embodiment of the invention.
Figure 11:
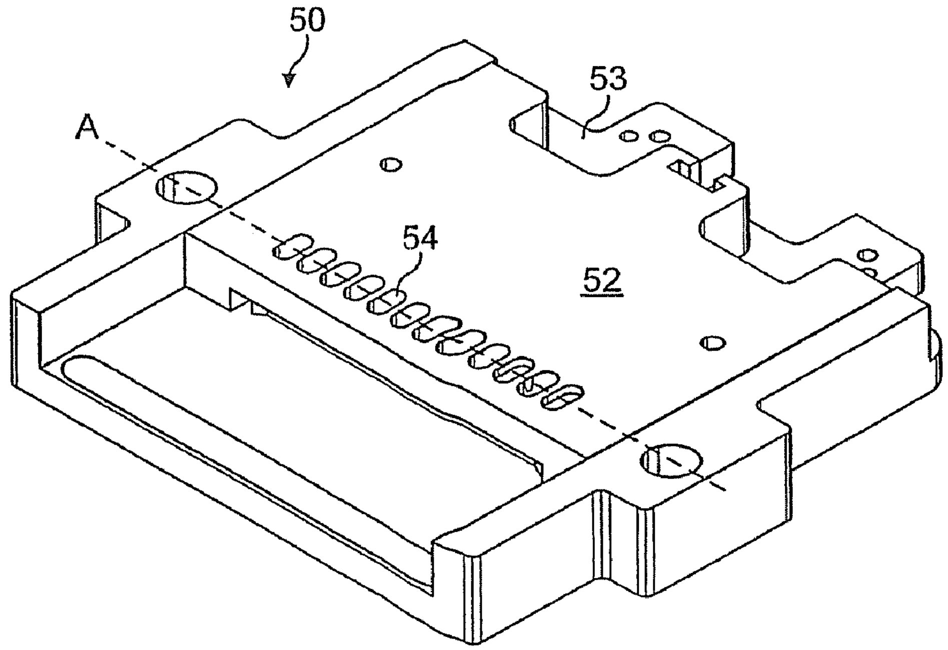
Figure 14:
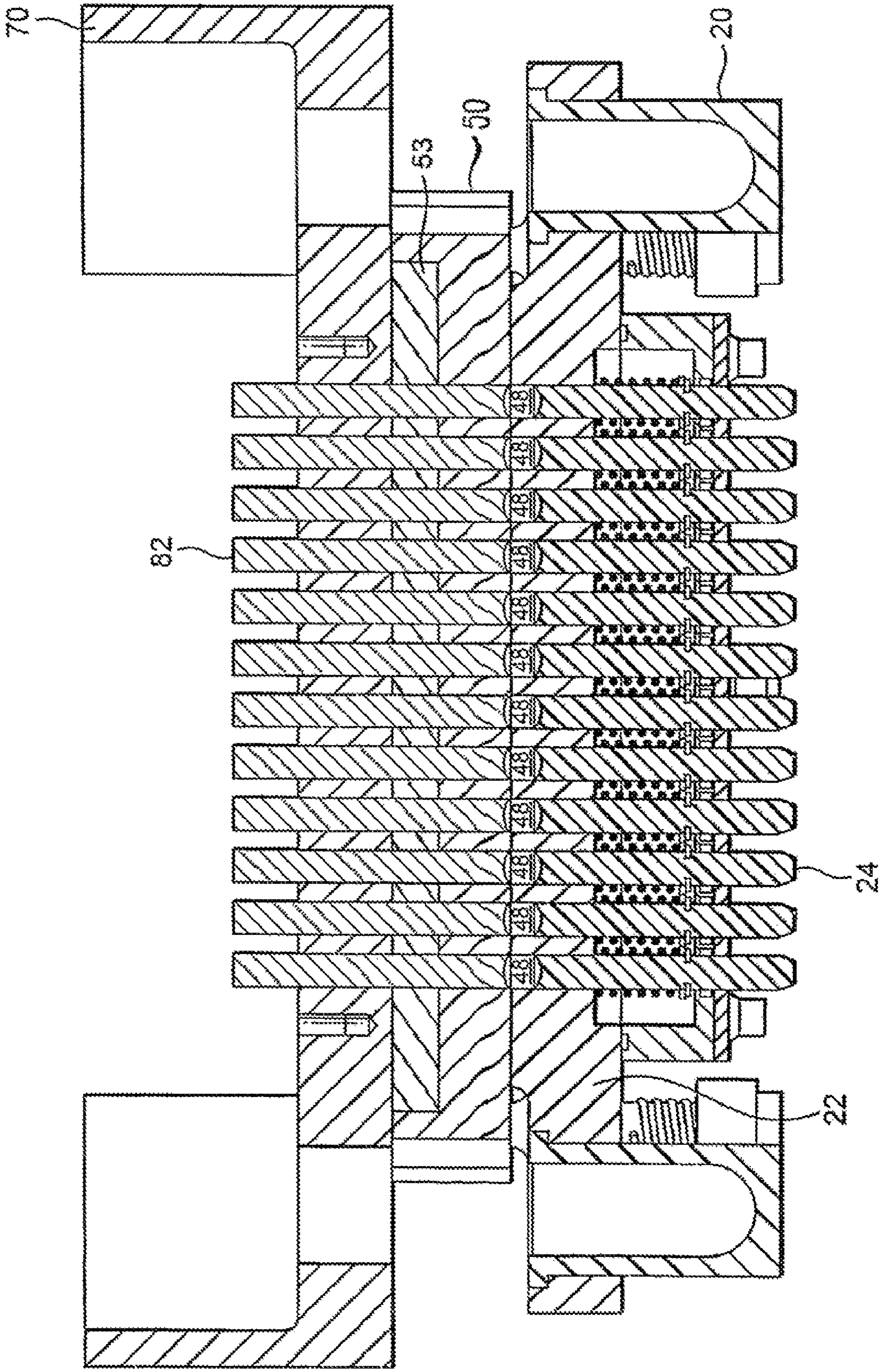
FIG. 14 shows a cross-sectioned view of the dosator, dosing and compaction units.

With reference to FIGS. 10 and 11, each powder dosing and compaction unit 130 has a slider mechanism 50. A slider mechanism 50 consists of two shaped plates 52, 53 that fit together as shown in FIGS. 10 and 11 to create cavities 54 of substantially the same dimension as the lightly pre-compacted slugs dispensed from the dosator head. The assembly of these two plates 52, 53 is mounted such they can slide relative to one another between position 'A' where the cavities are filled with powder (or pre-compacted powder slugs) and position 'B' where the powder is drawn over the compaction chambers delimited at their lower extreme by the pistons 24 of the platen 22 and at their upper extreme by the pistons 82 of the compaction unit at the other end. This will be explain in more detail below with reference to FIG. 14.

Figure 17A:
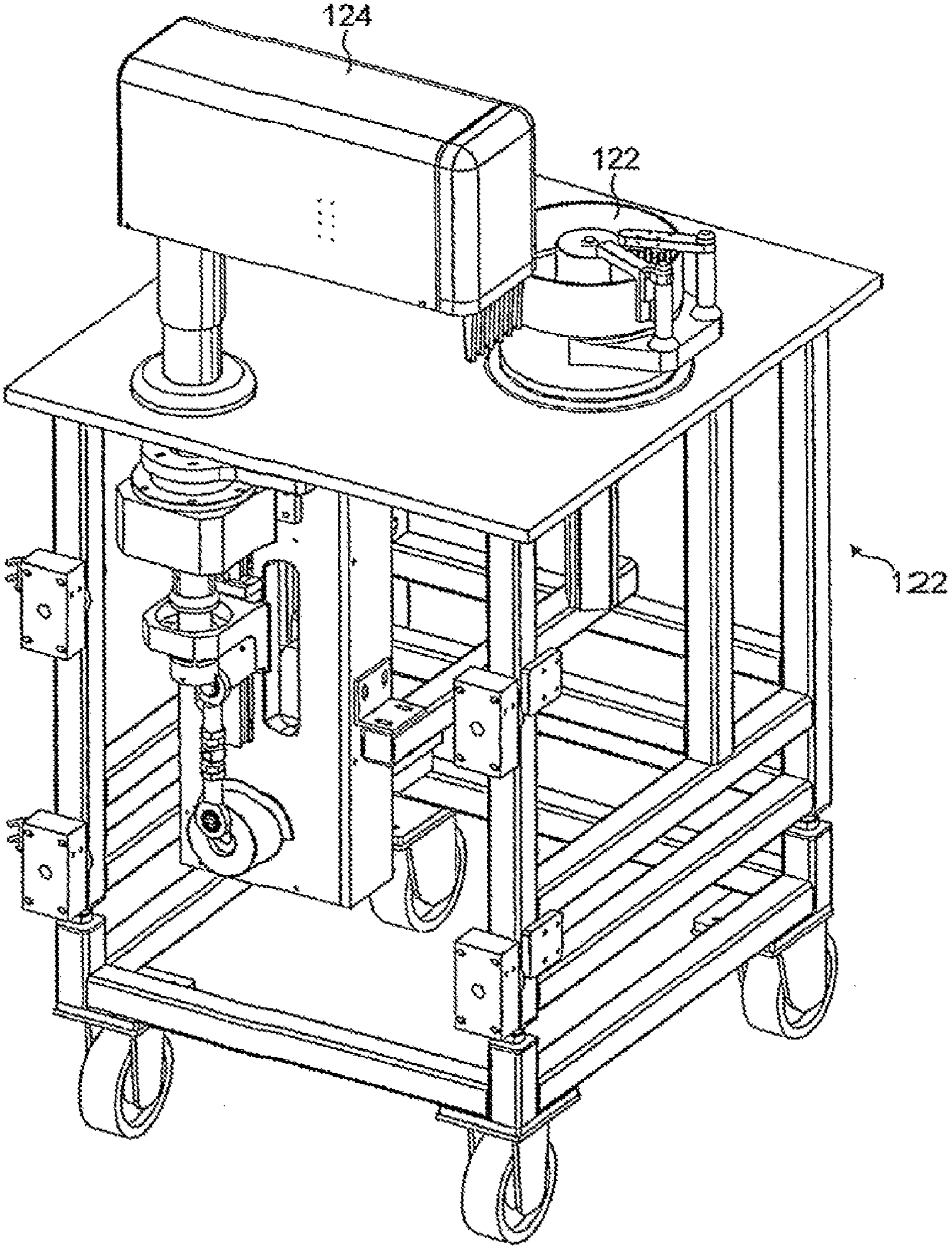
FIGS. 17A-C FIG. 17A shows a perspective view of a dosator table in accordance with an embodiment of the invention.
Figure 17B:
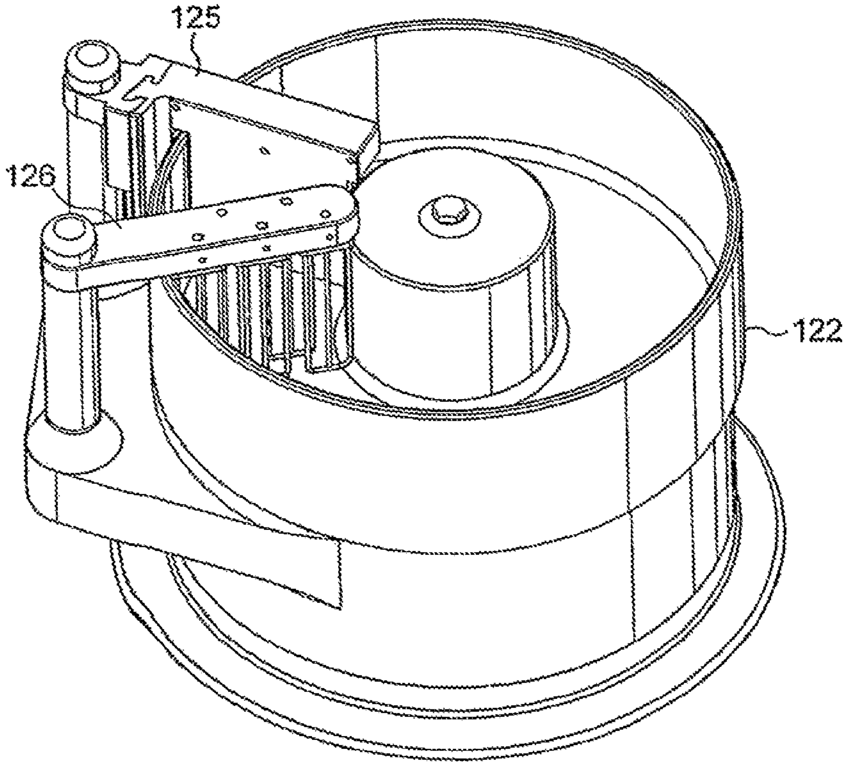
Figure 17C:
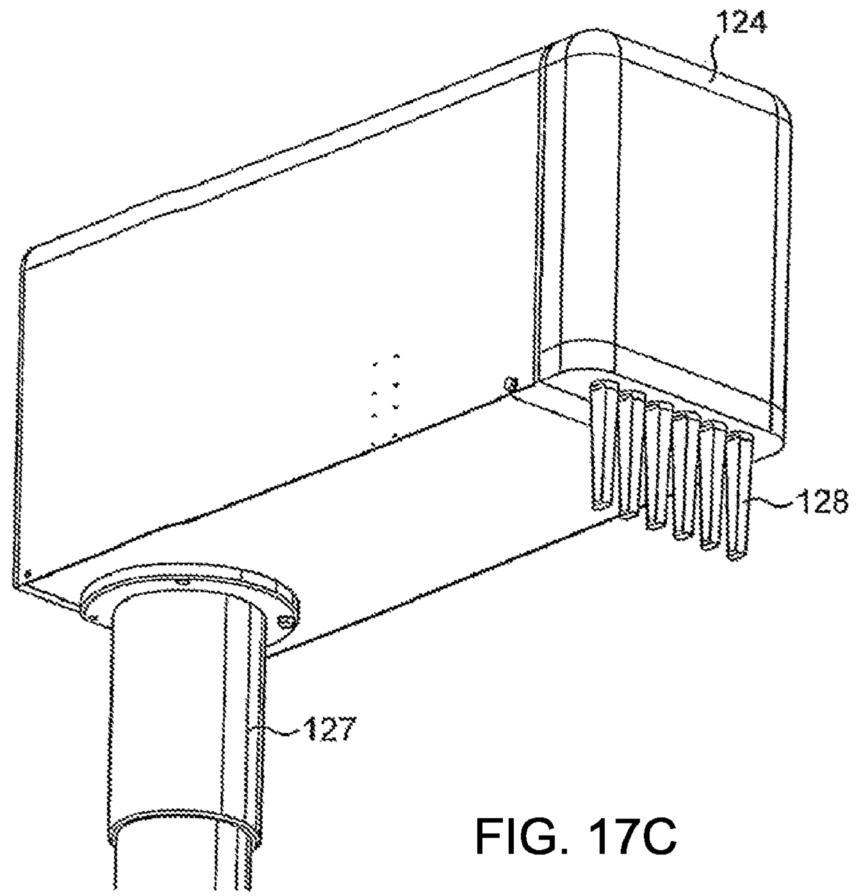

To ensure that the cavities 54 in the plates completely fill with powder they are preferably charged with lightly pre-compacted slugs from a known type of dosator head 124, see FIG. 17C.

Figure 12A:
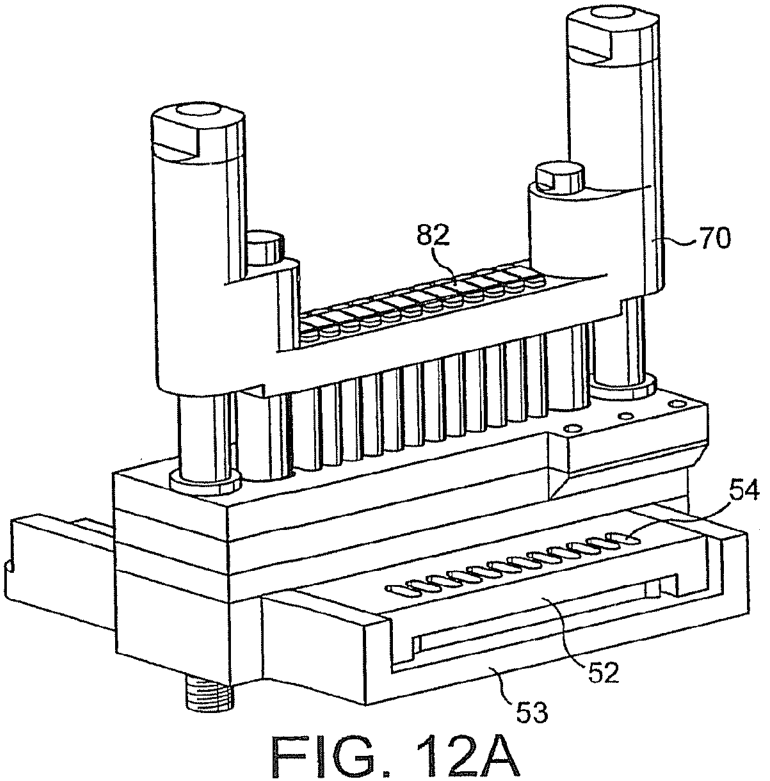
FIG. 12A-B respectively show front and rear perspective views of the dosing unit of FIG. 11 engaged with a portion of a dosator in accordance with an embodiment of the invention.
Figure 12B:
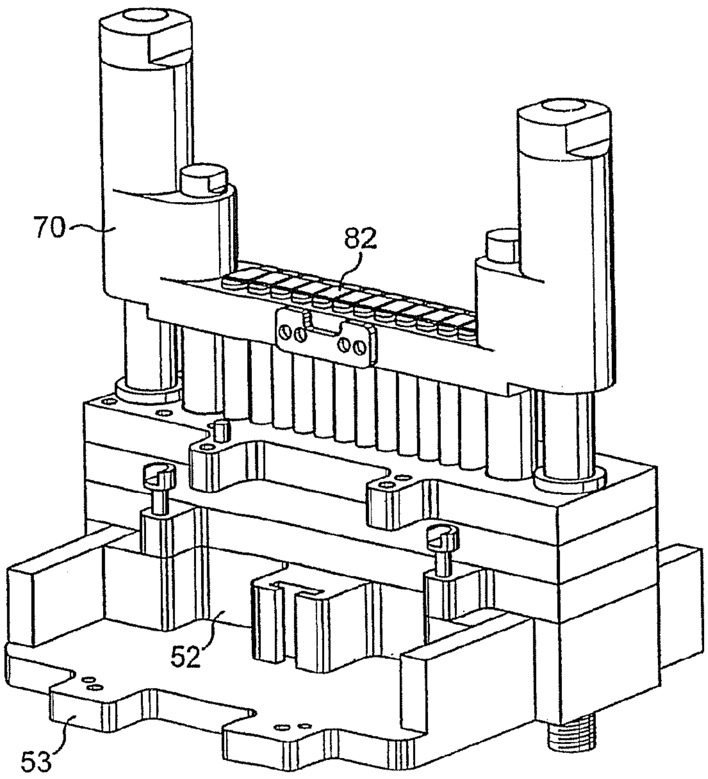
Figure 13A:
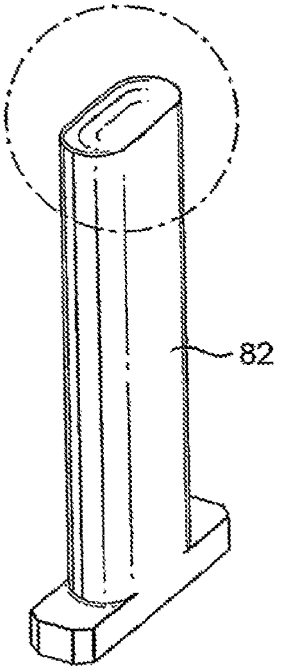
FIGS. 13A-C FIGS. 13A-B show perspective views of a compaction piston in accordance with an embodiment of the invention.
Figure 13B:
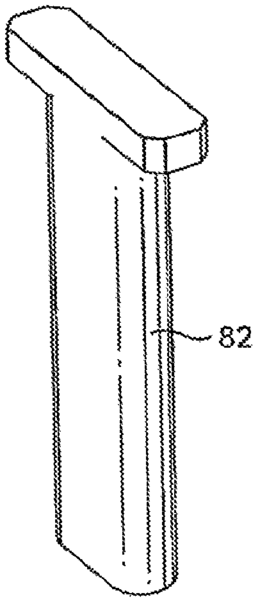
Figure 13C:
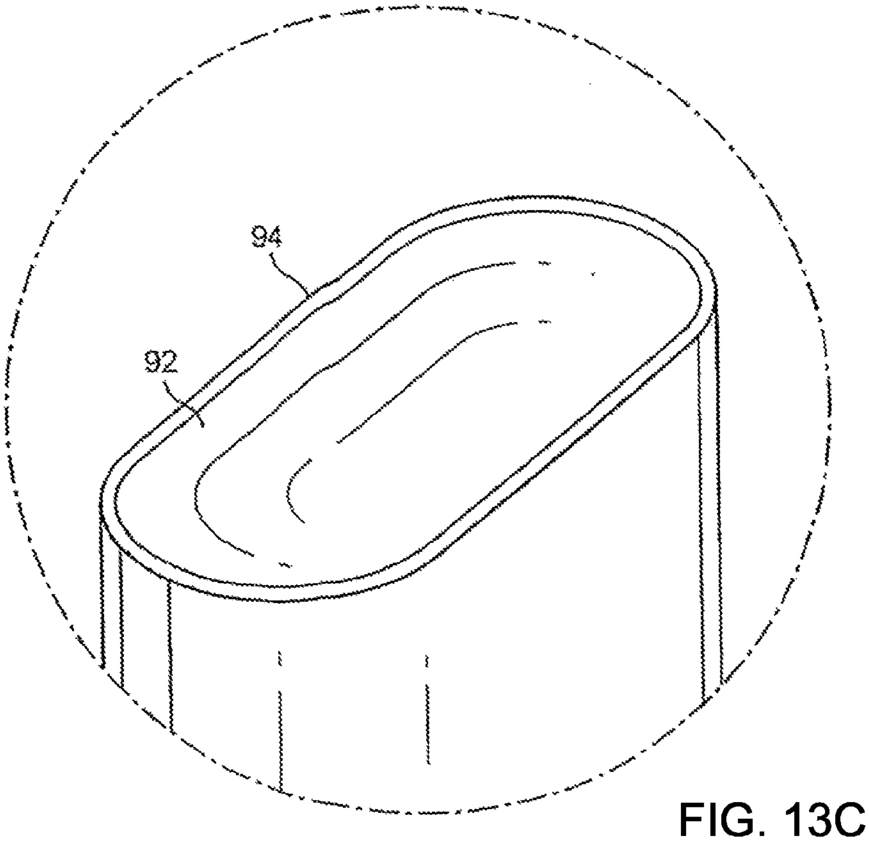

The insitu ("in film") compression of the powder is achieved by means of a row of pistons 82 that are mounted in the 'dosing piston holder' 70 above position 'B', as shown in FIGS. 11-12. FIGS. 13A-C illustrate the compression pistons 82; note the concave recess 92 in the front face of the piston and the square edge 94 around the circumference of the face as shown in FIG. 13C. The pistons can thus pass through the bores 54 formed by the plates 52, 53 at position B to compact the powder and cut the film, as will be described hereinafter.

Description of Thermoforming Unit

Figure 15A:
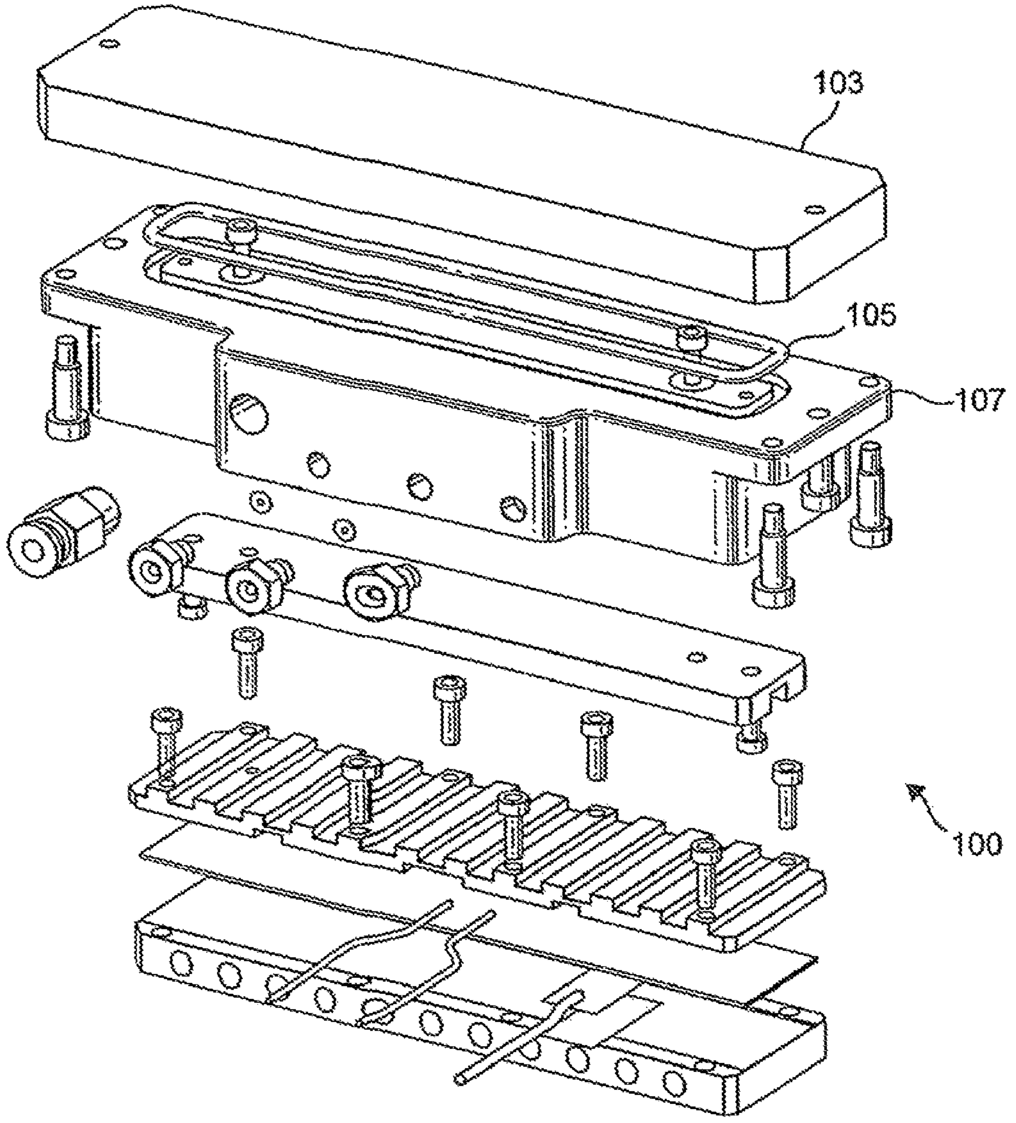
FIGS. 15A-B FIG. 15A shows a perspective view of a thermoformer in accordance with an embodiment of the invention.
Figure 15B:
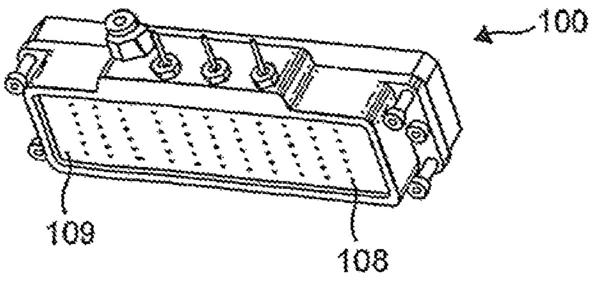

Details of the thermoforming unit, including a view of the holes in the heated plate, are shown in FIGS. 15A-B.

The thermoforming unit 100 consists of a flat heated plate 109 mounted in a chamber that leaves only the surface of the heated plate exposed. The thermoforming unit also has a heater cover 103, heater 105, top block and heated plate 109. The chamber is connected to a vacuum source and the vacuum is connected to the surface of the heated plate by an array of small holes 108 (approximately 0.5 mm diameter). These holes are a feature for the two thermoforming processes that form part of the process. They prevent air bubbles being trapped between the film and the plate.

In practice, thermoforming is most effective when there is adequate contact between the film to be preconditioned and the thermoformer plate 109. In the preferred embodiment the thermoforming process is assisted at station [1], by bringing the powder dosing and compaction unit 130 over the thermoformer and clamping it onto the film, and at station [3], by provision of an additional top clamping assembly.

Description of Thermoforming Process

The process starts with thermoforming the film onto the platen 22.

A sheet of film is placed over the platen 22 and the thermoforming unit 100 positioned over it. The thermoforming unit is then pressed onto the film and platen. This creates a split vacuum chamber with the film acting as a membrane that separates the upper chamber (thermoforming unit) and the lower chamber (platen). The contact between the underside of the film and the upper surface of the platen may, optionally, be improved by the application of additional pressure on the thermoformer. At station [1] this can be achieved by a mechanical clamping action of the powder dosing and compaction unit and at station [2] by separately providing any suitable top clamping assembly.

The thermoforming process is started by connecting a vacuum to the upper chamber. This pulls the film onto the heated plate, which is at a controlled temperature of typically 180° C. The values quoted for the temperature of the heated plate, the film heating time and the lower chamber vacuum level are typical but not exclusively definitive. The optimum values for these parameters are dependent on the physical characteristics of the film being used and thus on the film formulation. In general, different operating parameters will be required for different films. After an adjustable period of a few seconds vacuum is also connected to the lower chamber to evacuate the cavities in the platen. Then, when the vacuum level in the lower chamber has reached a set level (typically −0.6 barg (60 kPa) to −0.8 barg (−80 kPa)) and the film heating time has elapsed, the upper chamber is vented to atmosphere. The resulting pressure difference across the film forms it into the cavities in the platen. The thermoforming unit is then lifted off the platen to complete the thermoforming process.

Description Of the Powder Dosing Process

After the film has been thermoformed the powder dosing and compaction unit 130, 50, 70 is located over the platen 22.

The cavities 54 in the plates 52, 53 are slid to position A in which they are accessible to the dosator head 124 and pause for a predetermined time to allow filling. Lightly pre-compacted slugs are dispensed from the dosator head 124, more than dosator cycles may be required to fill the all of the cavities 54. The plates are then slid to position 'B' so that the cavities 54 (now full of powder) are directly above the cavities 48 in the platen. The action of the pistons 82 ensures that all the powder in the plate cavities 54 is be swept out and compacted into the film to form a plurality of partially enrobed powder slugs.

Description of the Powder Compaction Process

The compaction pistons 82 are pressed through the plates 52,53 to press the powder into the platen cavities lined with film (i.e. into the film pockets). Applying more force compacts the powder to form firm tablets within the film shells that have been formed into the platen cavities. In the preferred embodiment the lower pistons 24 of the platen 22 are stationary during the processes occurring at station [1].

The size of the finished tablets is fixed by the depth of the film formed pocket and is independent of the quantity of powder transferred because the stroke length of the compaction pistons 82 is fixed. Provided the force applied to compact the powder is in excess of that required to achieve the full stroke then a range of tablet weights can be achieved in a fixed size of finished tablets. The next step is to cut the partially enrobed slugs from the waste film web (first film).

Description of the Film Cutting Processes

To cut the first film the last movement of the compaction pistons makes them enter the top of the platen cavities. The pistons 82 enter about 0.1-0.4 mm below the upper flat of the raised edge profile 44 of the platen cavities 48. Preferably, the pistons 82 enter about 0.2 mm below the upper flat of the raised edge profile 44. This punch cuts the film and thus severs the partially enrobed slugs from the sheet of film they have been formed from. Thus, in the preferred embodiment the film is shear cut between the piston flats and the inside edges of the cavities.

The action of the compaction pistons entering the cavities in the platen is a beneficial feature of the preferred cutting process. It creates tablets with very well defined edges and overall shape as compared to the alternative method of using separate compression and cut processes.

The cutting of the second film (formed over the top of the top of the tablet in the later part of the process) is achieved in a similar way but in this case the cutting tool is a hollow tablet shaped tool provided in a transfer and cutting arm. In that case, the cutter tool engages with the outside edge of the raised profiles of the platen cavities to achieve a shear cut. This transfer arm and cutting tool will be described in more detail hereinafter with reference to FIGS. 16C and E.

Thermoforming Directly onto Powder Slugs/Tablets

The second film forming step is performed directly onto partially enrobed powder slugs. The partially enrobed powder slugs are raised proud of the platen surface to facilitate enrobing. Preferably the powder slugs are raised just more than half the depth of their sidewalls so that at least the half remaining uncoated can be enrobed. In practice, selection of the amount slugs should be raised depends on a number of factors, including the geometries and process in the first enrobe step and the extent of overlap desired.

Figure 16A:
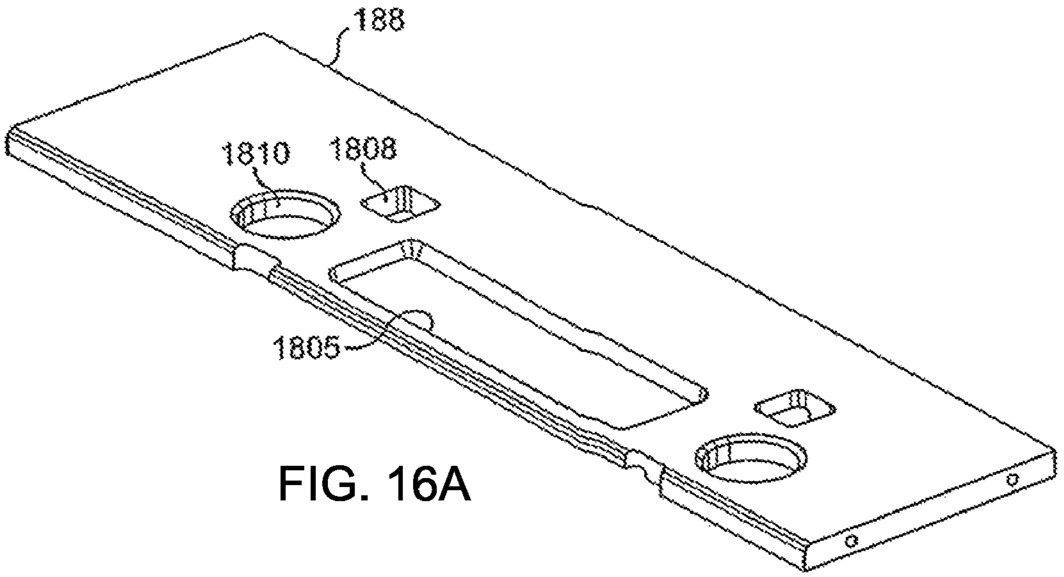
FIG. 16A shows an exemplary spacer plate in accordance with an embodiment of the present invention.

A spacer plate 188 (see FIG. 16A) is provided a predetermined distance, for example 5 mm above the platen surface. The spacer plate 188 is in the same plane as the platen surface and is fixed in relation to the platen throughout the second enrobe step. The spacer plate is provided with an opening 1805 having a cross-sectional area large enough to expose the plurality of partially enrobed powder slugs held in the platen below plus an a small area of the platen surface bordering the partially enrobed powder slugs. This opening is preferably provided with a sealing member about its periphery to assist the seal in the thermoforming process. The spacer plate also has bores 1810 for fixing means, such as bolts, and bores 1808 for location lugs.

With reference to FIG. 16B(i), before the second film is thermoformed on to the partially enrobed powder slugs the spacer plate 188 is secured in a position above the platen surface holding the raised, partially enrobed powder slugs 1815. The film 482 is provided on top of the spacer plate (as distinct from on top of the platen itself). A thermoformer 100 is deployed over the film and clamps it to the spacer plate-platen assembly. Although not shown here, the clamping effect can be enhanced by use of a further clamping assembly (referred to herein as the "top clamping assembly") on top of the thermoformer 100. Steps corresponding to those described hereinbefore in relation to the earlier thermoforming step are used to condition and form the film using vacuum and or pressure.

FIG. 16B(ii) shows that when the second film 482 is formed it is urged through the opening 1805 and down onto the raised, partially enrobed powder slugs below. The film is formed through the opening across the entire cross-sectional area of the opening so that the plurality of the partially enrobed powder slugs are enrobed in a single step. When the thermoformer has moved away the completely enrobed powder slugs are exposed in the web of waste film and the cutter on the transfer arm can be brought into the opening and, further, into cutting contact with the completely enrobed powder slugs.

The spacer plate thus has a plurality of purposes and beneficial effects. For example, it has a function of keeping the thermoforming unit away from powder slugs, which would otherwise be exposed to heat capable of denaturing them. This is the heat barrier function of the spacer plate. The spacer plate also provides protection for the powder slugs from the swings of the thermoformer and transfer arms. This is the physical barrier function of the spacer plate. In use, the powder slugs are only accessible to the transfer arm when the locator lugs and tapered bores have ensured accurate placement.

The second film covers approximately half the tablet sidewall if half the tablet is exposed above the platen and the film is cut at the outside edge of the raised edge profile. In a preferred embodiment, the only extra film available for overlap is that resting on the upper horizontal flat of the raised edge profile before cutting. Hence if the flat of the raised edge profile is 0.35 mm wide, the extent of overlap is equal to the amount of enrobed sidewall exposed above the platen plus the width of the flat on the upper surface of the raised edge profile. This depends on precise tolerances and good association between the film and the surfaces onto which it is formed. A skilled person will therefore understand how the degree of overlap can be controlled in this second film process, and how, beforehand, the amount of side wall already enrobed can be controlled by the position of the lower pistons in the first step.

Transfer Arm and Cutting Tool ("c-arm")

Figure 16C:
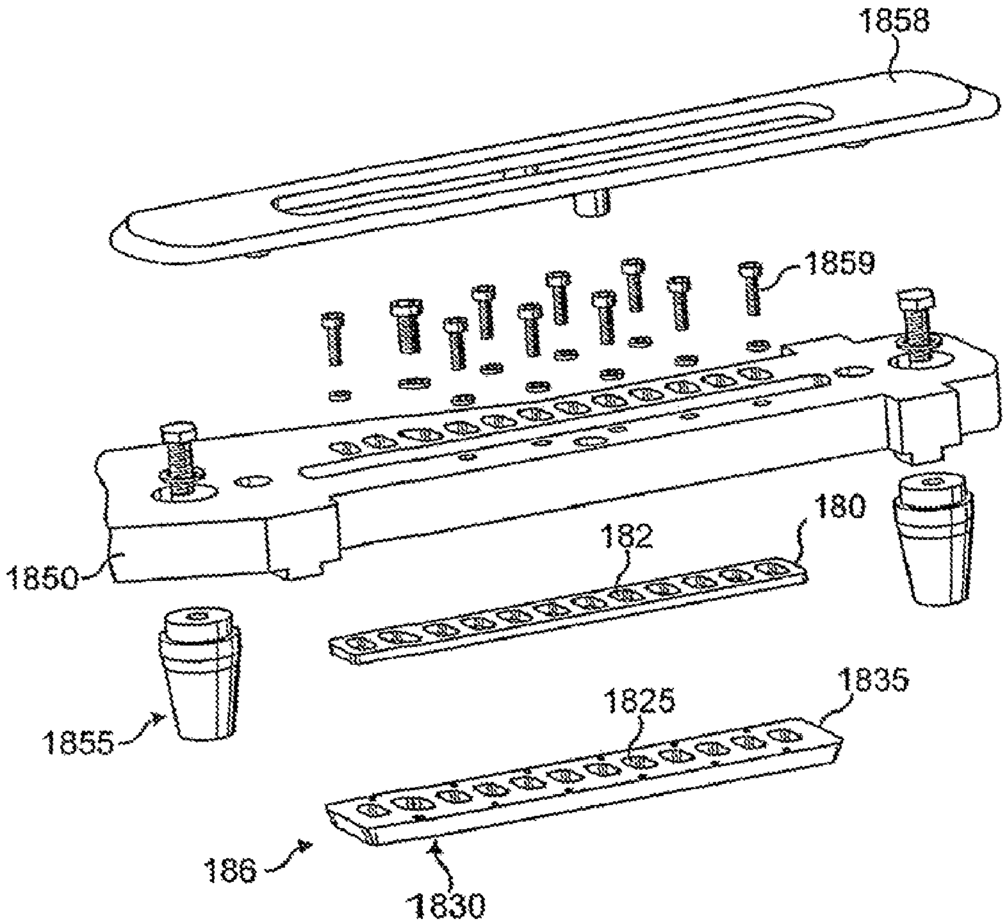
FIGS. 16C-E FIG. 16C shows an exploded perspective view of a combined transfer and cutting tool according to an embodiment of the present invention.

FIG. 16C shows the transfer and cutting arm in exploded view. The transfer and cutting arm comprises a moveable support 1850, locator lugs 1855, a cutting tool 186, a transfer gasket 1860, a back plate 1859 and fixing means 1859.

Figure 16D:
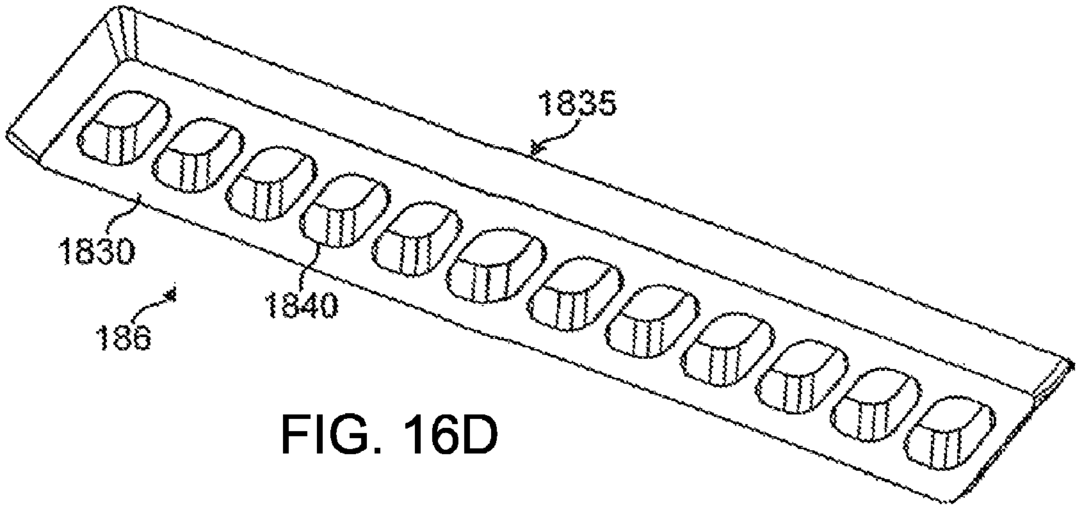

With reference in particular to FIG. 16D, the cutting tool 186 has a cutting surface 1830 provided with a plurality of tablet shaped holes 1825. Each hole has a cutting edge 1840 on the cutting surface 1830 and runs through from the cutting surface to a non-cutting surface 1835.

Abutting the non-cutting surface 1835 of the cutting tool 186 is a transfer gasket 180 (See FIG. 16C). The transfer gasket has another plurality of tablet shaped holes 182. These holes are slightly smaller than the holes of the cutting tool such that a tablet/compacted powder slug fits tightly into a hole in the transfer gasket once forcibly pushed (press-fitted) at least part way into the hole. The transfer gasket is a slightly flexible but resilient material, such as PTFE (polytetrafluoroethylene) or PETP (polyethylene terephthalate.), or less preferably silicon, in order to optimize the effectiveness of this press-fitting function. PTFE tends to have the best resilient, smoothness and hardness for this gasket function. It is therefore less likely to leave scarring on the enrobed dosage form. This material is also of a food/pharmaceutical grade (e.g. FDA approved) since the gasket is in contact with the tablets.

Figure 22A:
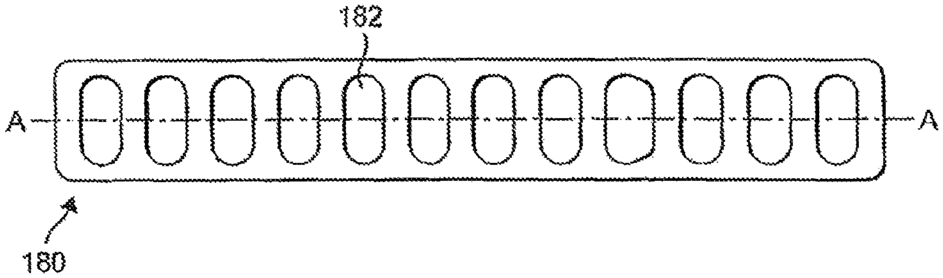
FIGS. 22A-E FIG. 22A shows a tablet gasket in accordance with an embodiment of the invention.
Figure 22B:
Figure 22C:
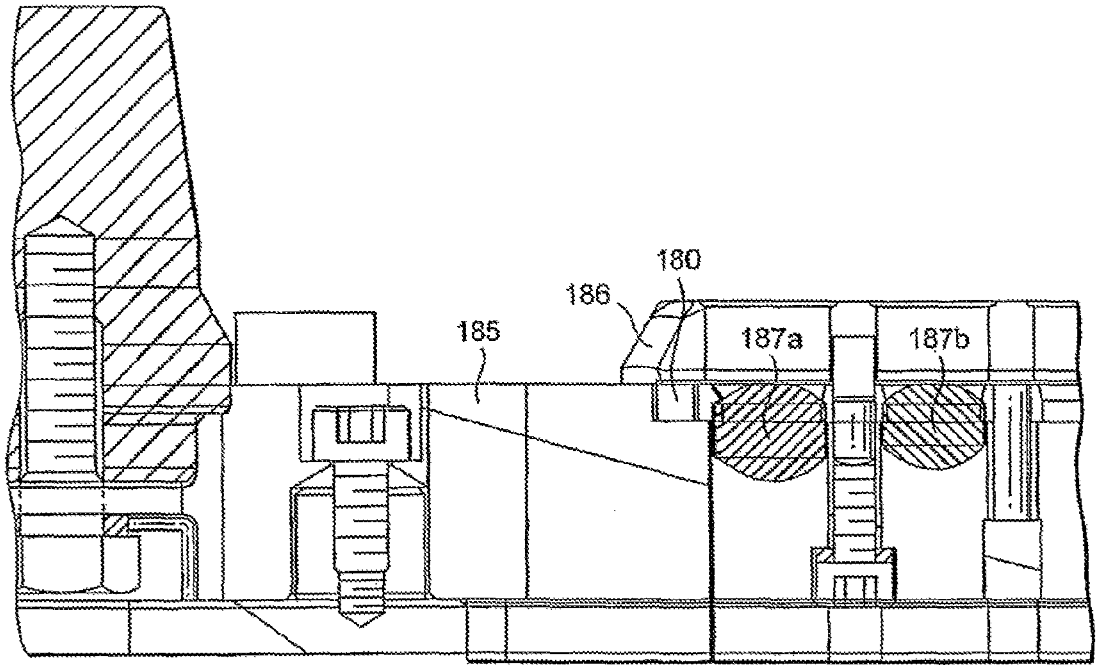

The gasket function is shown in more detail FIGS. 22A-E. The gasket has an array of apertures 182 to receive the compacted powder slugs or tablets. As shown in FIG. 22B the apertures are chambered or tapered (i.e. diameter of aperture 184 tablet enters is, for example, 7.6 mm diameters while the other "top" side of aperture 183 is 6.9 mm diameter). This configuration of the gasket also provides an ironing action on the tablet as the tablet enters via the wider aperture, pauses for transfer and exits via the narrower aperture. Preferably, the recently enrobed and thus over lapping half of the tablet lead in and out of the gasket.

Figure 16E:
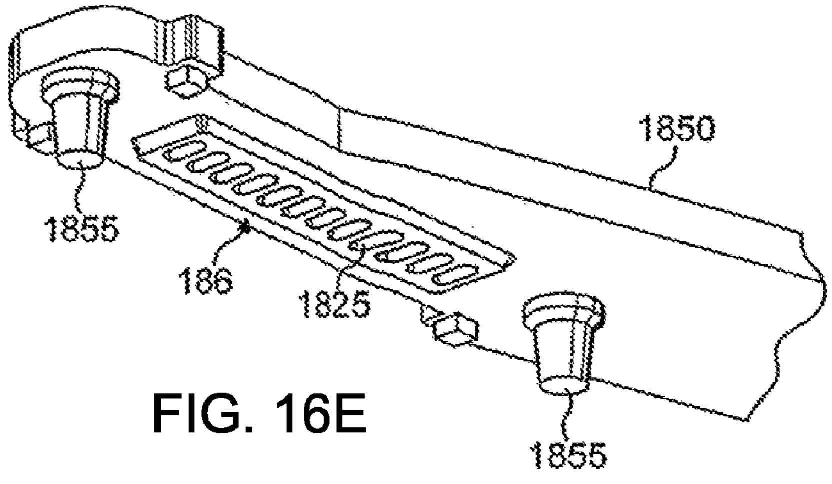

The transfer and cutting arm is shown in assembled form in FIG. 16E. The cutter surface can be seen exposed on the underside of the support.

Figure 22D:
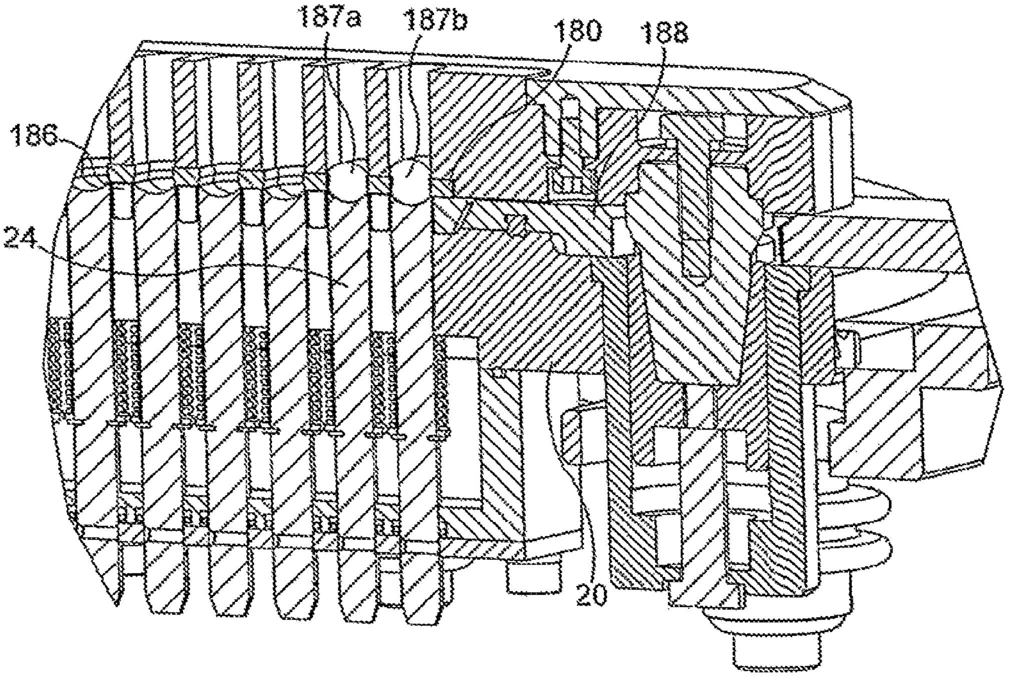
Figure 22E:
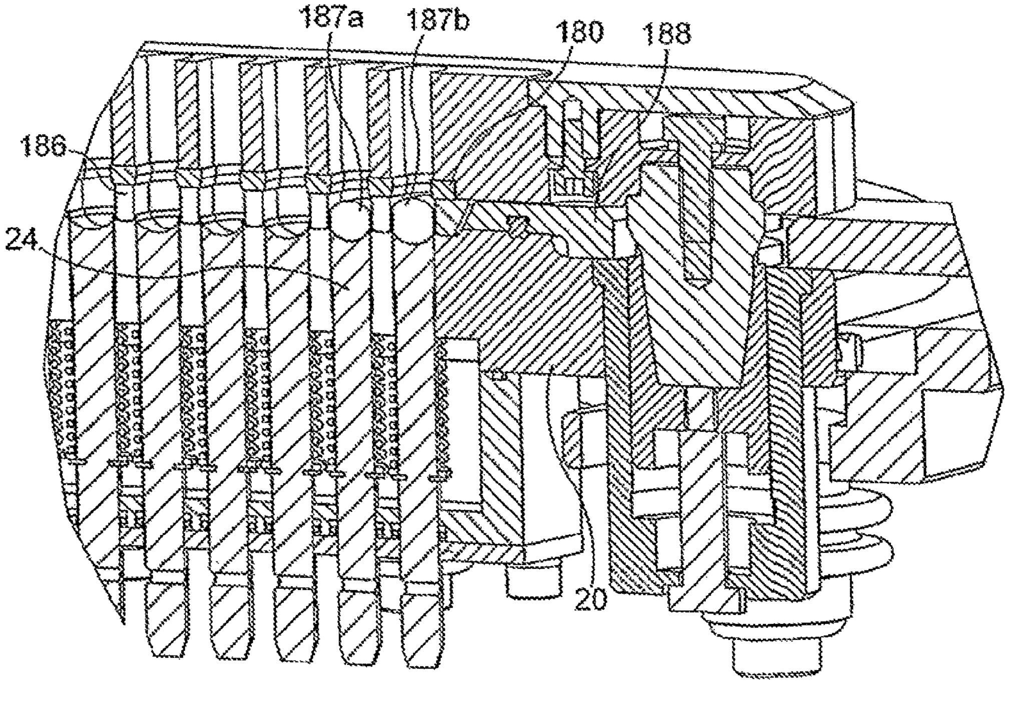

In use, the arm is deployed to cut the completely enrobed powder slugs from the waste film web and transfer them to the ironing tool. The cutting action is has been described hereinbefore as a shear cut on the outside edge of the raised edge profile of the cavities 48. After the cutting action the arm advances further so that the enrobed slugs are accommodated within the cutter and provided to the transfer gasket for press-fit engagement therewith. The enrobed slugs may be removed from their press-fit engagement with the transfer gasket for example by finger pushers or the like. A tablet with a 4 mm sidewall 187*a* and a table with a 3 mm sidewall 187*b* is shown in the tablet gasket 180 in FIG. 22C. FIG. 22D shows how the transfer arm lowers and the second cutter tool 186 cuts tablet out of web of second film and FIG. 22E shows the lower piston push tablets into tablet gasket in transfer arm.

Powder Dosator

In the preferred embodiment, the powder dosator assembly is configured as shown in FIGS. 17A-C and FIGS. 18A-C. FIG. 17A shows a dosator 120 with a dosator powder bowl 122 and a dosator dosing head 124. The dosator powder bowl is shown in more detail in FIG. 17B, with an anti-clogging device 126 and a powder leveling device 125 or doctor. The dosator powder bowl rotates at a constant clockwise speed, and the powder is hopper feed to the dosator dosing head as shown in more detail in FIG. 17C. The dosator dosing head has dosing tubes 128 and a rotary head 127 to rotate the dosator dosing head. The dosing tubes may be configured with internal tamping pins (not shown) for pre-compacting the powder in the dosing tubes and transferring the powder from the tubes into the pocket. In use the dosator powder bowl rotates at a constant clockwise speed, and the dosator powder bowl is fed with powder through a hopper system. The powder is set to a specific height by the dosator leveling device, and the dosator head rotates over the dosing bowl. The dosator tubes are charged by lowering the tube to a known depth into the dosator powder bowl. The internal tamping pins lightly pre-compact the powder, in order to avoid spillage and ease of handling later on in the process. The powder is retained in the tubes by the pre-compaction effect but there is a vacuum retention facility available if required. i.e. for very fine fill powders. (Fill volume is varied by altering the depth that the tubes are lowered into the dosator powder bowl). Then the dosator head rises and rotates through approximately 180° to a position over the dosing unit 130 shown in FIGS. 18A-C and discussed in greater detail below. The dosator head is lowered to the top of the dosing unit cavities 54, and the lightly pre-compacted slugs are transferred using the internal tamping pins from the dosator tubes into alternate cavities of the dosing unit. In this embodiment the platen has twelve cavities of an eleven and half millimeter pitch. Since in this embodiment the dosator head has six tubes, the dosing unit is charged in two cycles of the dosator head. After discharging the dosing unit the dosator head rises and rotates over the dosing powder bowl ready for the next cycle.

Figure 18A:
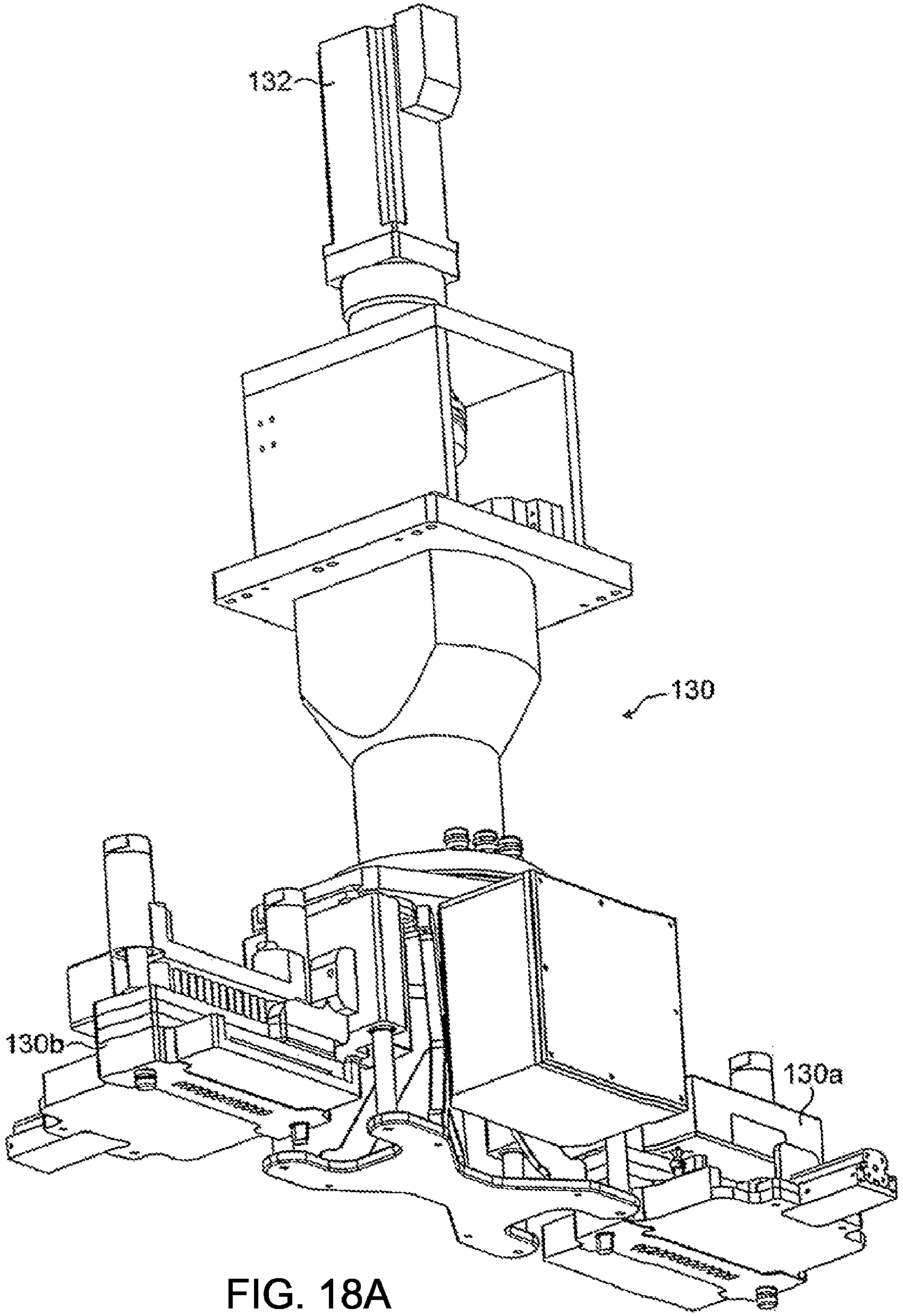
FIGS. 18A-C FIG. 18A shows a perspective view of a dosing unit and rotor head assembly in accordance with an embodiment of the invention.
Figure 18B:
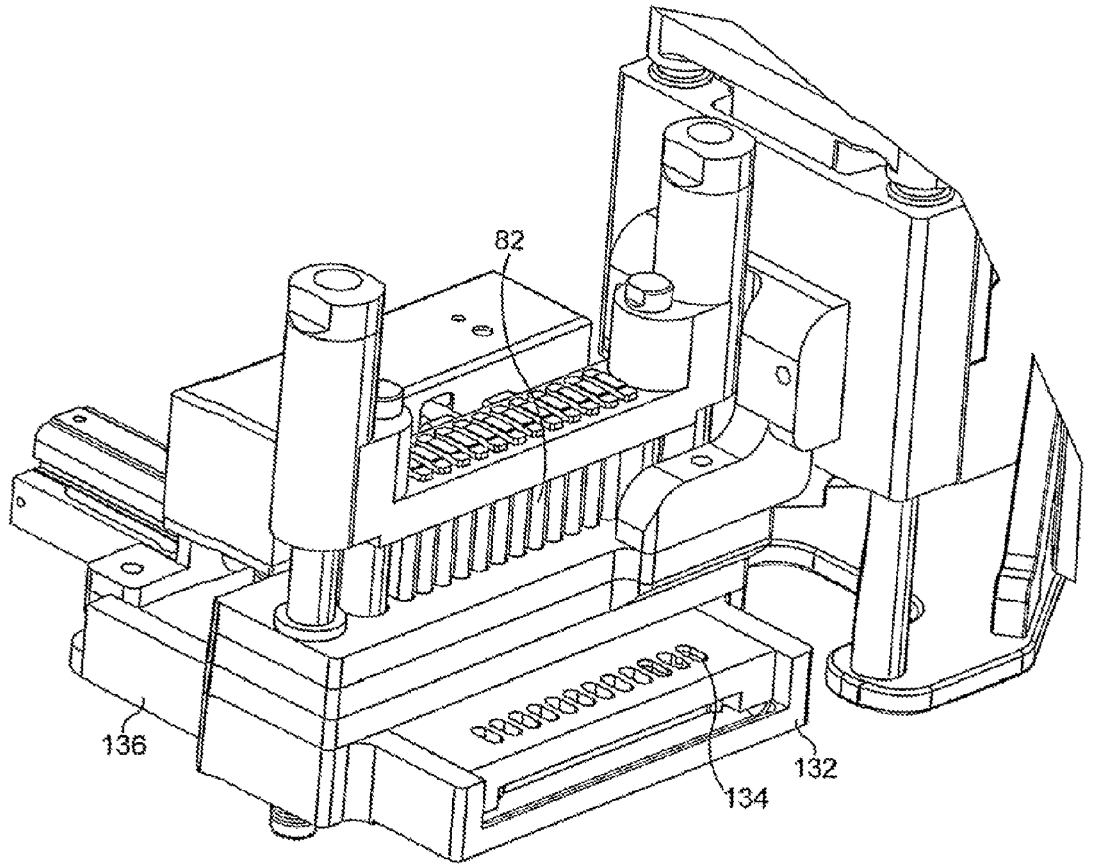
Figure 18C:
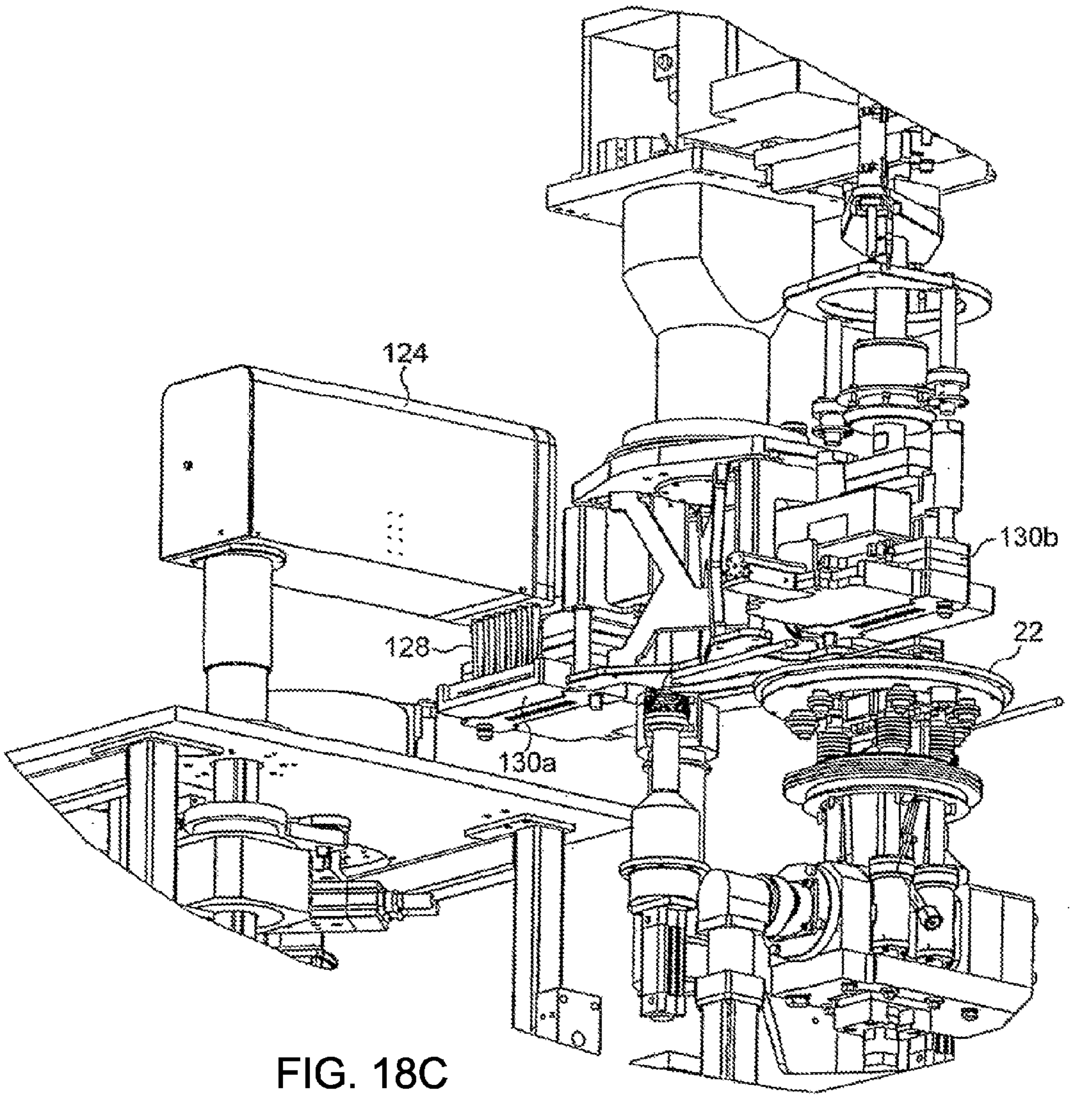

The powder compaction and dosing assembly 130 is shown in FIGS. 18A-C, and is configured in this embodiment with two dosing units 130*a*, 130*b* mounted on a rotor head assembly 131, as shown in FIG. 18A. The rotor head is driven by a servo motor. FIG. 20B shows a dosing unit in more detail. Each dosing unit has a dosing sledge 50 with dosing cavities 54 for holding the powder upon discharge from the dosing tubes of the dosator dosing head. The dosing units also each house the compaction pistons 82. A pneumatic cylinder 50 may slide sledge from a charging position to dosing position and vice versa as explained hereinbefore. The final location in dosing position may be achieved by precision location pins actuated by pneumatic cylinders.

FIG. 18C shows the dosator dosing head charging the dosing unit 130*a* in dosing position, and the dosing unit 130*b* preparing to dose the film pocket in the cavities 48 of the platen 22. The dosator powder tubes 128 charge out the powder into the cavities of the slider. The rotor head 131 rotates the dosing units 130*a*, 130*b*. Dosing unit 130*a* assumes the dosing position and doses the pockets having the vacuum formed film. After, the compaction pistons are engaged and compress the powder in the pocket (in-situ) and cut the film as discussed above. While this is happening, the other dosing unit 130*b* is being charged by the dosator ready for the next machine cycle. At any given time one dosing unit is in the powder charging position, while the other dosing unit is in the process position.

Spray Jet Assembly

Figure 18D:
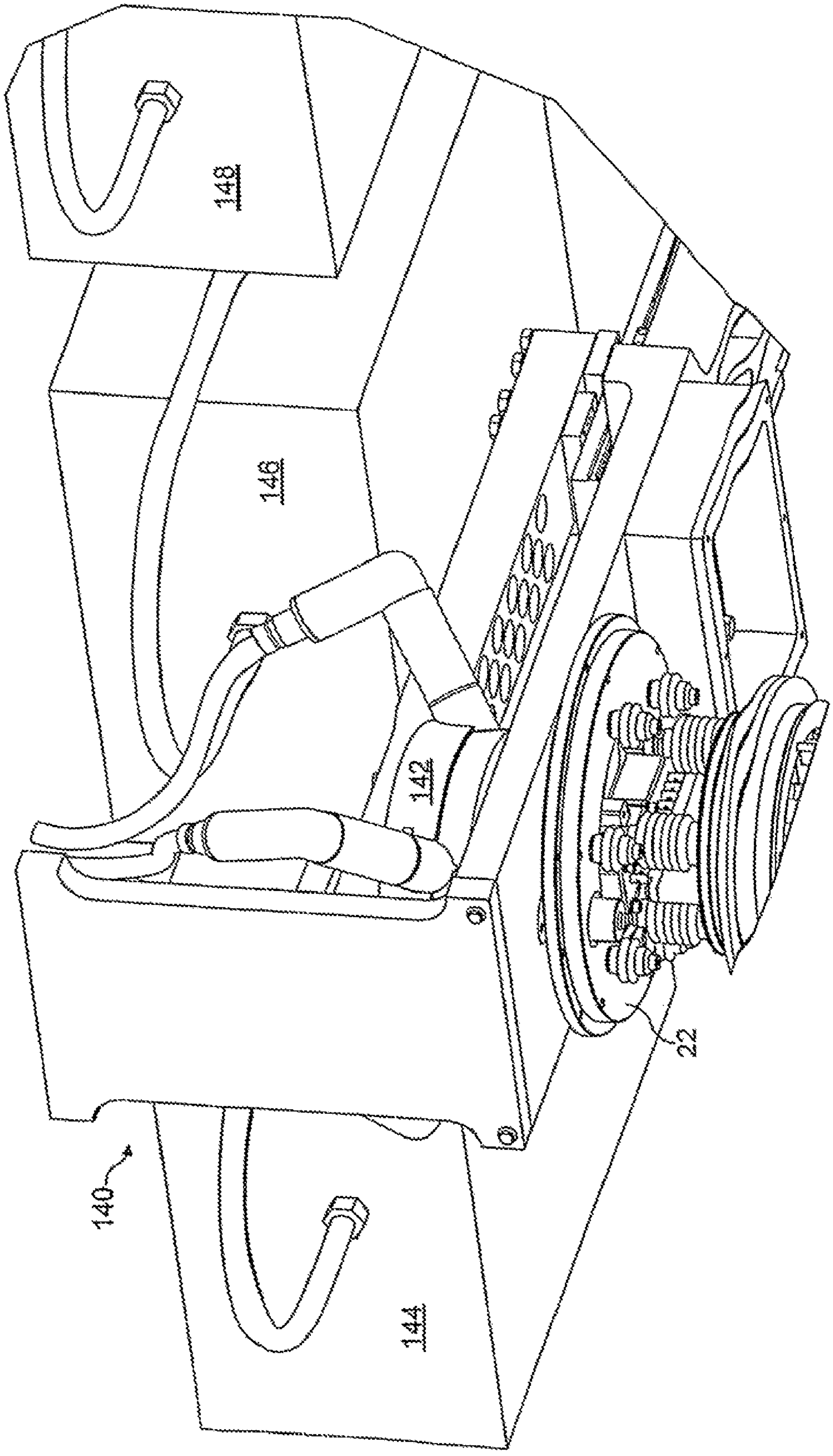
FIGS. 18D-F FIG. 18D shows a perspective view of spray jet equipment according to an embodiment of the invention, from below, with a platen in spray position.
Figure 18E:
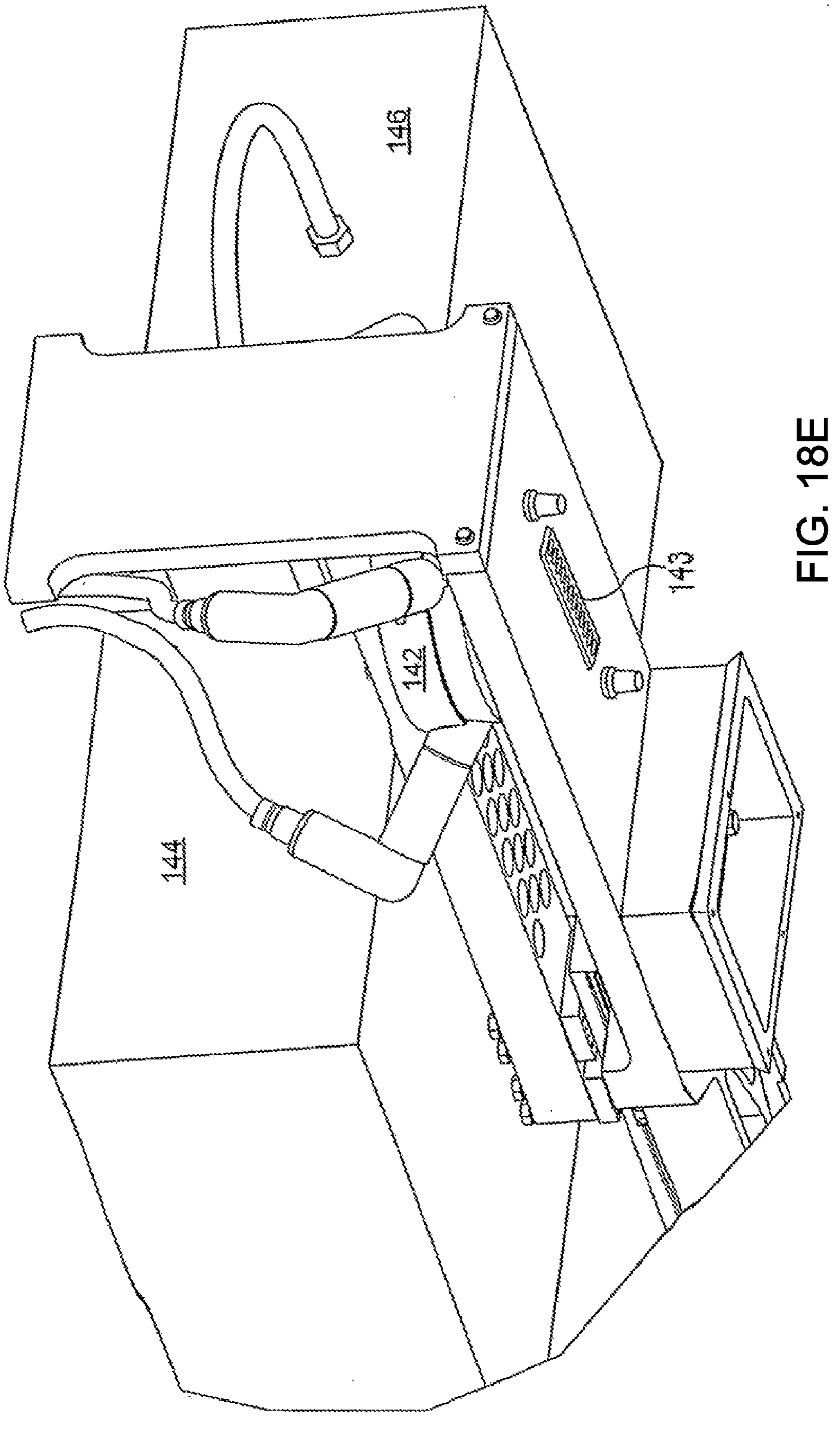
Figure 18F:
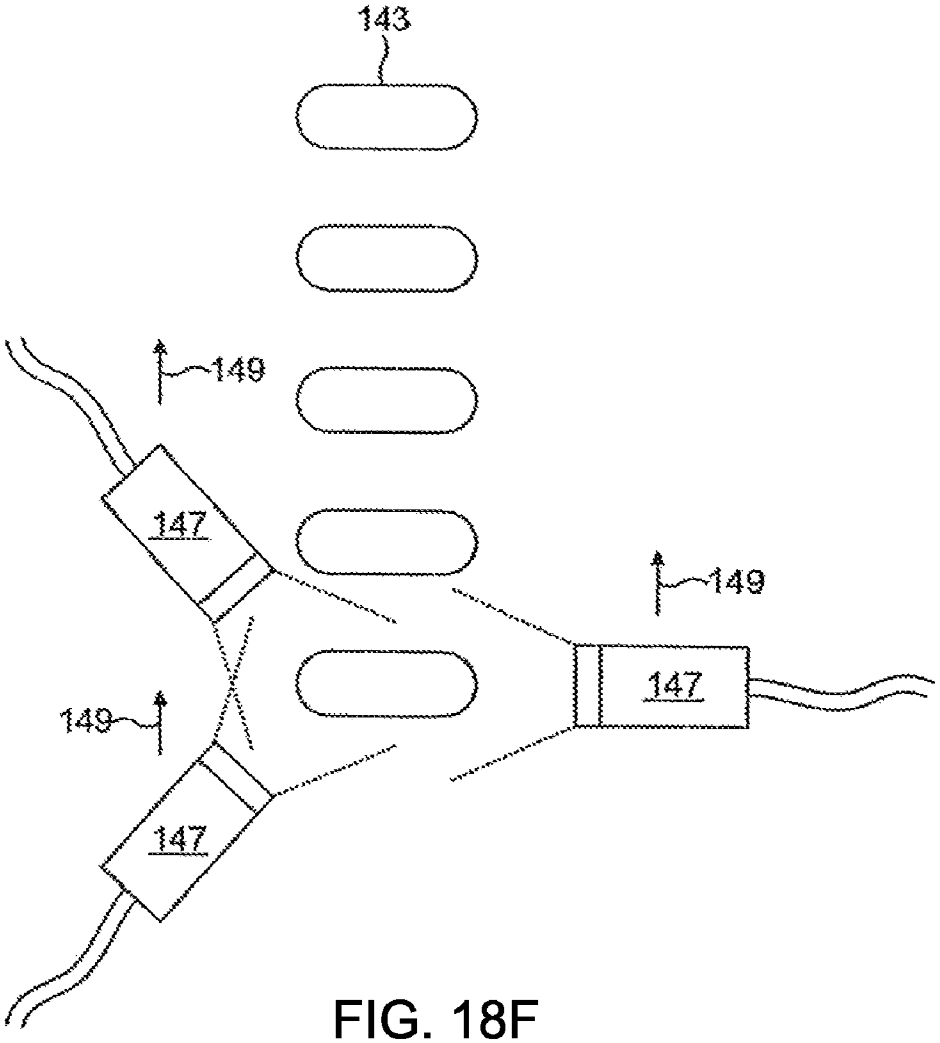

In the preferred embodiment, adhesive (glue) is applied prior to the application of the second film onto the partially enrobed slug, i.e. to the first film and the powder slug. FIGS. 18D-F show a spray jet assembly 140, using inkjet technology, that may be used to spray the glue into a pattern (or to spray ink for printing purposes) onto the partially enrobed slug.

The exemplary spray jet device 140 is provided with a sprayer 142 having three heads 147 supplied with adhesive or other fluid. The location of the spray heads 147 can be precisely controlled by the control electronics 144-148. The spray heads are controlled in a fixed configuration with respect to one another such that they sweep the line of partially enrobed powder slugs 145 raised proud of the platen 22 in the direction of arrows 149. In this way a predetermined amount of adhesive may be applied to the whole circumference of the side wall of each of the partially enrobed slugs in a single sweep. A screen 143 (visible in FIG. 18B) may be used to expose the partially enrobed slug and protect the platen 22.

The spray process occurs at station [2] once the lower pistons 24 have moved the partially enrobed powder slugs upwards so that approximately half the depth of the side walls of each is above the platen surface.

Cleaning Unit

Figure 19:
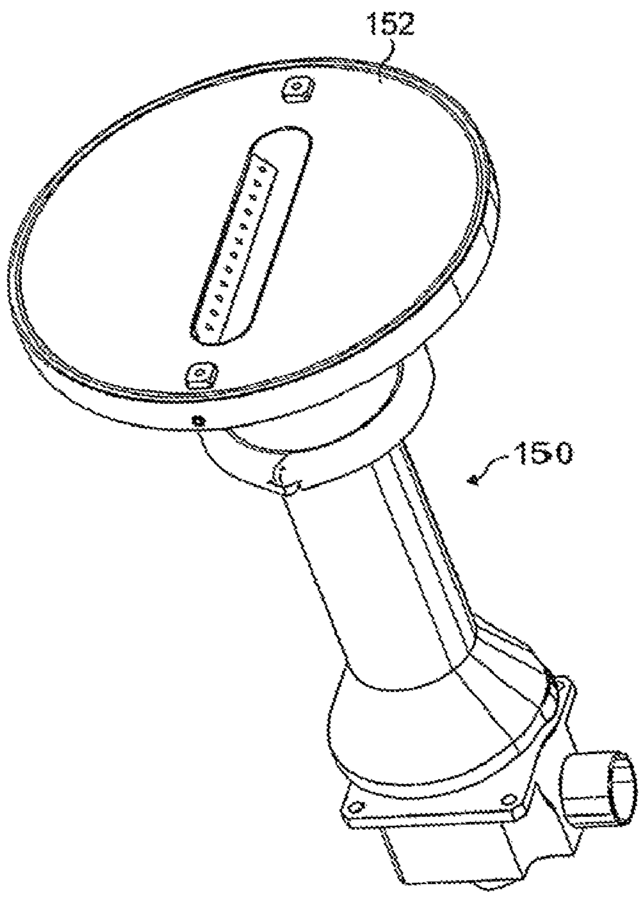
FIG. 19 shows a perspective view of a vacuum for cleaning the platen and the pockets in accordance with an embodiment of the invention.

The cleaning unit 400 includes a vacuum nozzle unit 150 is applied to platen to disturb any waste powder in the cavities of the platen, as shown in FIG. 19. Air is forced through the nozzles into the cavities of the platen when the vacuum nozzle unit is oriented proximate the cavities and the platen hood 152 forms a seal with the platen to enable the cleaning process.

Turntable and Platen Support Mechanisms

Figure 20:
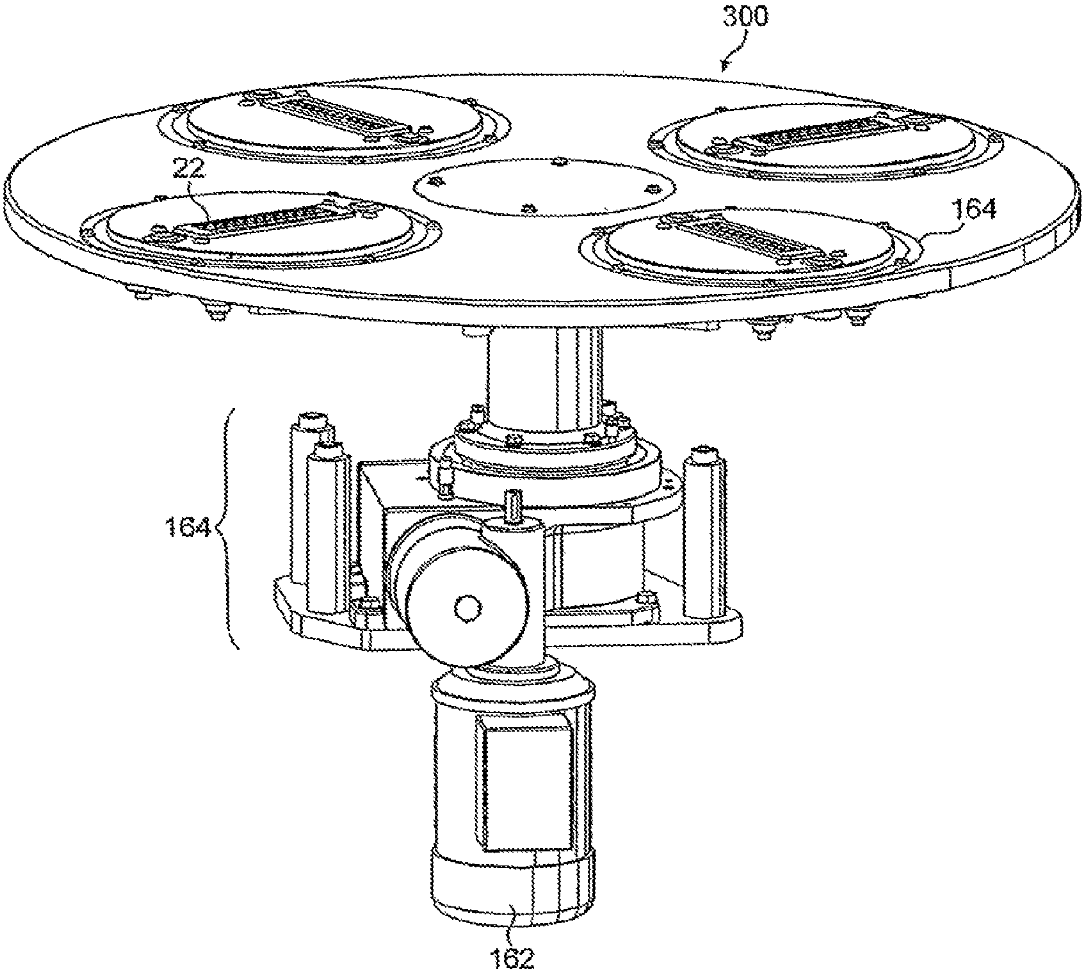
FIG. 20 shows a perspective view of a turntable for holding the platen to transfer the platen from one processing station to another processing station in accordance with an embodiment of the invention.
Figure 21:
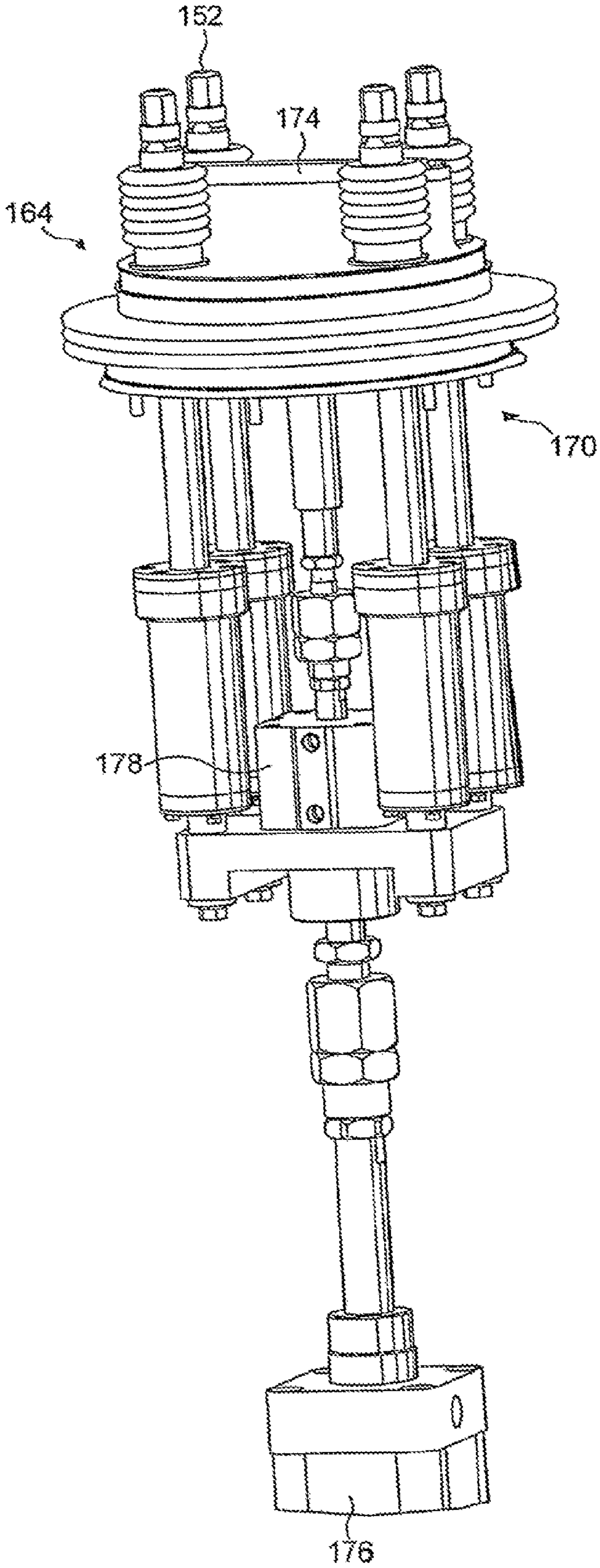
FIG. 21 shows a perspective view of a cam unit for raising and lowering the platen in relation to the turntable in accordance with an embodiment of the invention.

With reference to FIGS. 20 and 21, there is described the turntable assembly 300 for holding the platen and transferring the platen from one station to the next during processing. An indexing drive system 162 of the turn table is provide to rotate the platen through 90□ for each process cycle. The platen may be held in the turntable by a lower platen retaining assembly 164 with a seal retaining ring that may be secured to the turntable. A platen may be raised from the turntable by a cam unit 170 shown in FIG. 21 where rods 172 lift platen out of turntable, follower 174 makes contact with underside of lower pistons 24 in the platen 22 to facilitate movement, pneumatic cylinder 178 raises and lowers lower pistons, and pneumatic cylinder 176 raises and lowers the platen. The cam unit 170 is preferably an eccentric cam unit, using for example a TOX unit (TOX is a trademark in certain countries of Tox Pressotechnik GmbH & Co. KG of Germany).

Preferably, the platen is raised from the turntable to ensure that the turntable is not exposed to the compaction pressure forces during processing.

With this type of support assembly, each of the four platens may be processed simultaneously in four stations. For example the first station [1] may perform dosing, compaction and partial enrobement, the second station [2] may perform the application of glue to the sidewall of the partially enrobed slug, the third station [3] may perform the second film enrobement on the opposite side of the partially enrobed slug and ironing, and the fourth station [4] may be platen vacuum cleaning station using air jets and vacuum to dislodge and suck processing dust to clean the platen.

Detailed Example of Preferred Rotary Process

The station [1] procedure of dosing, compaction and partial enrobement is as follows. The film indexes. The charged dosing unit 130*a* rotates through 180° to the process position and turntable 160 indexes through 90° to process position. The platen 22 is lifted out of turntable and lower pistons 24 are set at the appropriate operating height using the eccentric cam. The film lifter assemblies lower. The thermoformer 100 rotates through 90° to process position. The powder dosing and compaction assembly comprising the dosing unit clamps thermoforming unit, the film and the platen together and film is thermoformed into platen cavities. The powder dosing and compaction assembly releases and lifts using its air spring pneumatic cylinder. The thermoformer returns to the home position, and the powder dosing and compaction assembly returns to clamp the dosing unit to the platen. Precise location is achieved using the tapered lugs on the dosing unit and spring loaded tapered bushes on platen assembly. The dosing unit slider 132 is moved to the dosing position and charges the cavities 134. The compaction pistons compress the powder into the cavity to form the partially enrobed slug (or tablet) and subsequently cut the film in one action. The powder dosing and the compaction assembly releases. The powder dosing and compaction unit lifts using for example the air spring pneumatic cylinder. The film lifters lift, stripping the waste file from the platen, the platen drops back into the turntable accentuating the stripping effect. The lower pistons return to home position when the station 1 cam unit is lowered, ready for the turntable to index. Whilst these processes were happening the other powder dosing and compaction unit 130*b* is being charged by the dosator head ready for the next machine cycle. The charging of each powder dosing and compaction unit is performed in two passes (6 alternate cavities are dosed and then the remainder) due to the close spacing of the platen cavities.

At station [2] the spray jet 140 applies glue to the sidewalls of the partially enrobed slugs. This process begins with the turntable 160 indexing through 90° to process position [2]. The platen 22 is lifted out of turntable by the station 2 cam unit and by pneumatic cylinder 136 and precise location is achieved using the tapered lugs location on the underside of the inkjet main body and spring loaded tapered bushes on platen assembly. The lower pistons 24 are set at the appropriate operating height using the eccentric cam, as a result the tablets are moved up the cavities to the correct level for the glue application. A fast outward stroke of print head assembly 140 is gets to the start position. A slower constant speed inward stroke applies the desired glue pattern (logo) to tablets using the print head configuration. The platen drops back into the turntable and lower pistons return to home position when the station 2 cam unit is lowered. Ready for the turntable index.

The turntable 300 indexes through 90° to process position [3] and a transfer arm rotates through 90° to a position underneath the ironing tool. The platen is lifted out of turntable by the station 3 cam unit, and the lower pistons are set at the appropriate operating height for enrobing the partially enrobed slugs using the eccentric cam. The thermoformer unit 100 film and lifters lower to apply second film to the spacer plate above the partially enrobed slugs. The transfer arm assembly raises to mate with ironing unit using the air spring pneumatic cylinder and film indexes. The thermoformer rotates through 90° to process position, a finger pusher assembly pushes the tablets into ironing tool. A top clamping assembly clamps the thermoformer, film and spacer plate of the platen together. The transfer arm assembly lowers clear with ironing unit using the air spring pneumatic cylinder and rotates 90° to home position. The film is formed over the partially enrobed tablets and the ironing unit indexes is to next position. The top clamping assembly releases and the thermoformer returns to the home position. The finger pusher assembly evacuates the finished tablets from ironing tool and empties the row of cavities ready for a new batch of tablets to be ironed. A pick off head performs a pick and place operation to take the product out of the machine. The transfer arm indexes 90° to the cutting position above the platen. The top assembly clamps the transfer arm, its locating lugs mating with the spring loaded tapered bushes of the lower platen assembly. Finally the cut is executed at the very end of the stroke of the top clamping assembly. The top clamping assembly holds the transfer arm, spacer plate 188 assembly and platen together. (The spacer plate 188 provides a gap between the thermoformer and the partially enrobed slugs to ensure that the thermoformer does not cause damage to the compacted slugs while retaining and heating—I.e. conditioning—the second film prior to thermoforming the second film onto the partially enrobed slugs. The lower pistons are reset to the maximum height using the eccentric cam, pulling or pushing/lifting the tablets from the lower platen into a PEPT gasket contained in the transfer arm.

The top clamp assembly holds the transfer arm down whilst the cut tablets are transferred from the platen 20 into the tablet gasket 180, contained in the arm, using the lower pistons of the lower platen assembly 20. The top clamping assembly then releases, the film lifters strip the waste film from the spacer plate 188 and platen, and the transfer arm lifts the cutter to clear the film and film lifters, using the air spring pneumatic cylinder. The platen drops back into the turntable accentuating the stripping effect and lower pistons return to home position when the station 3 cam unit is lowered. The transfer arm indexes 90° to the home potion under the ironing tool and the finger pushers urge the enrobed slugs up from the transfer arm into the ironing tool.

At station [4] is a platen vacuum 150 cleaning station, using airjets and vacuum to dislodge and suck dust, respectively. The turntable 160 indexes through 90° to process position to begin. Then the platen 22 is lifted out of turntable by the station 4 cam unit 170 by pneumatic cylinder. Initially lower pistons 24 remain at home positions, and the vacuum head 152 is lowered to mate with platen. The vacuuming process begins, and the lower pistons are set to upper operating height using the pneumatic cylinder until the vacuuming process ends. The platen drops back into the turntable and lower pistons return to home position when the station 4 cam unit is lowered and the vacuum head is raised.

Exemplary Timing Diagram for Process

Figure 23:
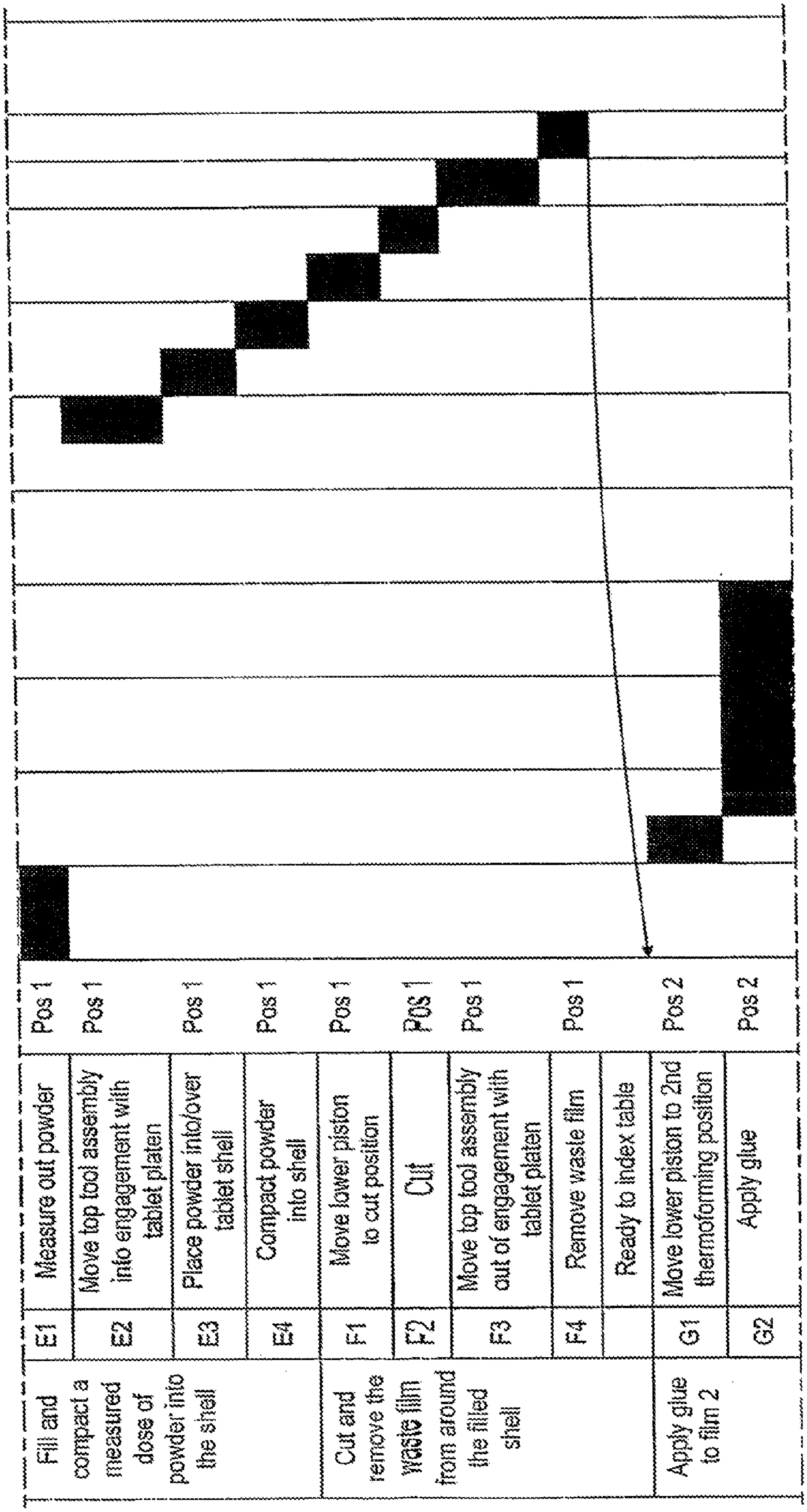
FIG. 23 shows an exemplary timing diagram of a system in accordance with an embodiment of the invention.
Figure 23:
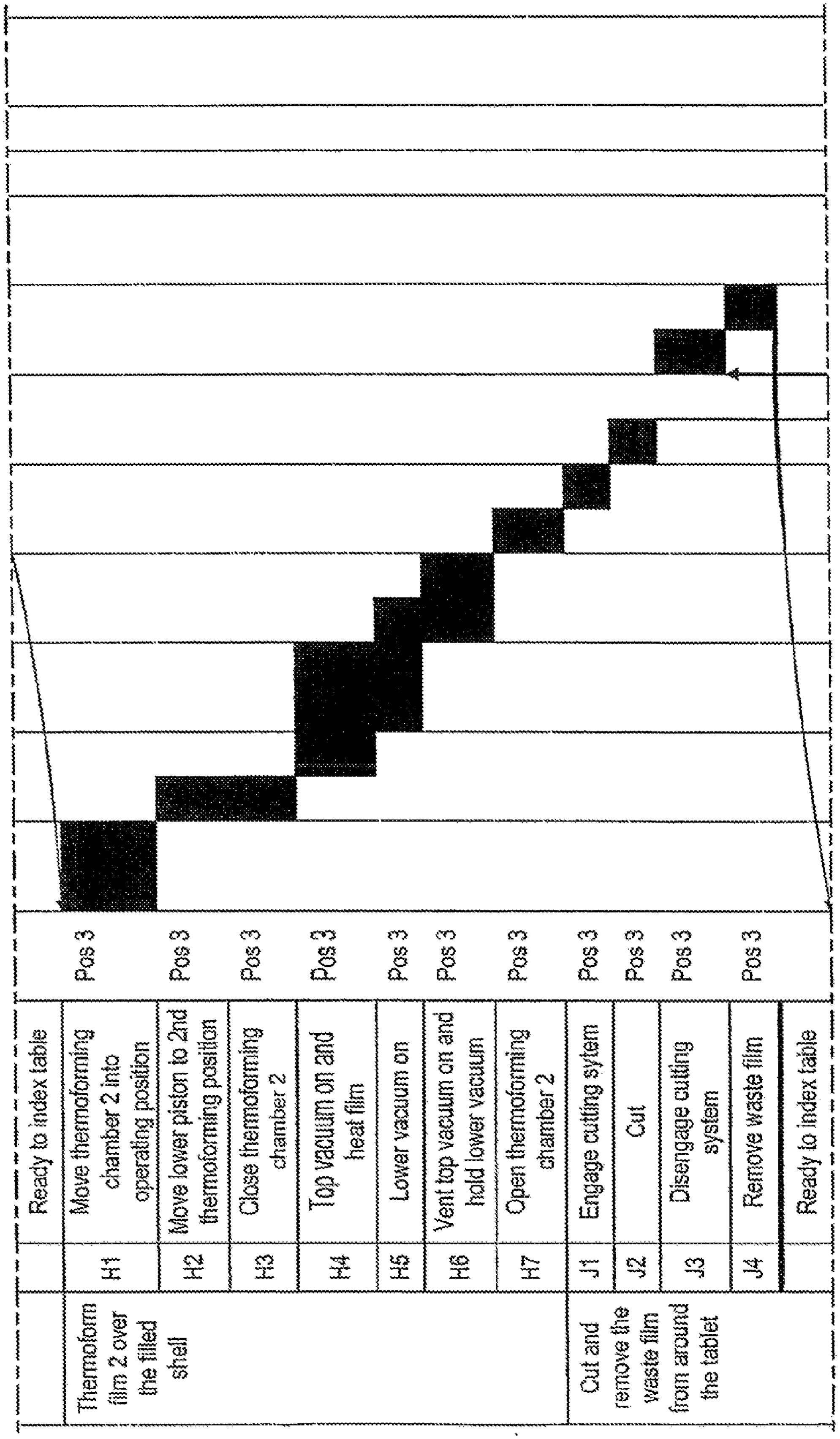
Figure 23:
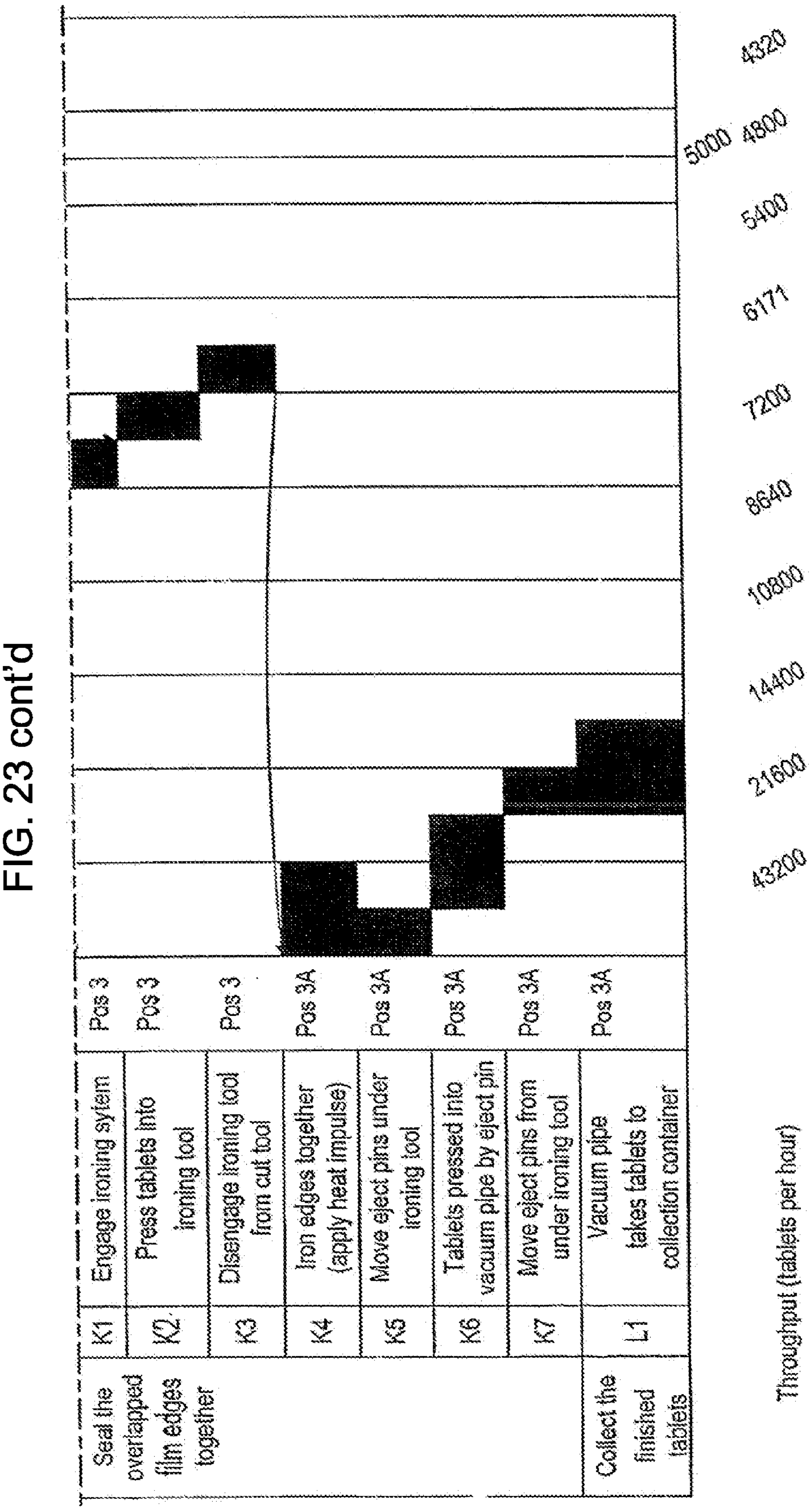

A draft timing diagram 110 for the complete process is shown in FIG. 23 to help clarify the sequence of events for the thermoforming, dosing, compaction and cutting processes.

It will be understood that the processes and apparatus as described above provide advantages. It will be appreciated that specific embodiments of the invention are discussed for illustrative purposes, and various modifications may be made without departing from the scope of the invention as defined by the appended claims.

What is claimed is:

1. Apparatus for forming a compacted dosage form coated with a film, the apparatus comprising:

compaction equipment capable of a first enrobing step in which powder is compacted into a film formed in a plurality of pockets disposed in a platen to provide a plurality of partially enrobed dosage forms;

enrobe equipment capable of a second enrobing step in which said partially enrobed dosage forms are enrobed to produce completely enrobed dosage forms;

a combined transfer and cutting tool comprising a cutter and a transfer gasket, wherein the platen and the combined transfer and cutting tool are distinct units, wherein the gasket is arranged proximate to the non-cutting surface of the cutter such that the cutting holes of the cutter link to the press-fit holes of the gasket.

2. Apparatus as in claim 1, wherein the cutter comprises a cutting surface and a non-cutting surface and wherein the cutting surface is provided with a plurality of tablet-shaped cutting holes each extending from the cutting surface to the non-cutting surface.

3. Apparatus as in claim 1 or 2, wherein the gasket is provided with a plurality of press-fit holes.

4. Apparatus as in claim 3, wherein each of said plurality of press-fit holes is tapered in cross-section, the larger opening of the taper being provided towards the cutter and the narrow opening of the taper being suitable to retain dosage forms in a press-fit manner.

5. Apparatus as in claim 1, wherein the gasket comprises a flexible, resilient material suitable for accommodating tablets in press-fit manner.

6. Apparatus as in claim 1, wherein the material of the gasket is selected from one or more of: PTFE; PETP; and silicon.

7. Apparatus as in claim 1, wherein said transfer gasket transfers said completely enrobed dosage forms from said plurality of pockets.

* * * * *